(12) United States Patent  (10) Patent No.: US 7,617,280 B1
Webster et al.  (45) Date of Patent: Nov. 10, 2009

(54) METHODS FOR ADMITTING CONFERENCE CALL HOSTS AND PARTICIPANTS INTO CONFERENCE CALLS

(75) Inventors: Craig A. Webster, Omaha, NE (US); Kevin L. Pauba, Omaha, NE (US); Myron P. Sojka, Logan, IA (US); Michael T. Mateer, Omaha, NE (US); Melissa A. DeLong, Council Bluffs, IA (US); Jonathan P. McIntosh, Omaha, NE (US)

(73) Assignee: West Corporation, Omaha, NE (US)

( * ) Notice: Subject to any disclaimer, the term of this patent is extended or adjusted under 35 U.S.C. 154(b) by 958 days.

(21) Appl. No.: 10/814,861

(22) Filed: Mar. 31, 2004

Related U.S. Application Data

(60) Provisional application No. 60/552,469, filed on Mar. 12, 2004.

(51) Int. Cl.
*G06F 15/16* (2006.01)
(52) U.S. Cl. ........................ 709/204; 370/261
(58) Field of Classification Search ................ 709/204, 709/227, 217; 379/201, 202, 203; 370/260, 370/261
See application file for complete search history.

(56) References Cited

U.S. PATENT DOCUMENTS

| | | | |
|---|---|---|---|
| 5,027,387 A | 6/1991 | Moll | |
| 5,483,587 A * | 1/1996 | Hogan et al. ........... | 379/202.01 |
| 5,504,808 A | 4/1996 | Hamrick, Jr. | |
| 5,559,875 A | 9/1996 | Bieselin et al. | |
| 5,598,536 A | 1/1997 | Slaughter et al. | |
| 5,631,904 A | 5/1997 | Fitser et al. | |
| 5,719,928 A | 2/1998 | Pinnell et al. | |
| 5,825,858 A | 10/1998 | Shaffer et al. | |
| 5,861,907 A | 1/1999 | Wada | |
| 5,883,964 A | 3/1999 | Alleman | |

(Continued)

OTHER PUBLICATIONS

Vail, The Perfect Way To Conduct Your Meeting, www.vailsys.com, Feb. 2, 2004.

*Primary Examiner*—Ramy M Osman
*Assistant Examiner*—Marshall McLeod

(57) ABSTRACT

Methods for entering hosts and participants into new or existing conference calls. The method can include receiving a call from a given caller at a VRU. The caller may be either a conference host or participant. The VRU obtains a conference code from the caller and forwards it to a proxy server, along with a request to the proxy server to enter the given caller into a conference call. The proxy server determines that the request from the VRU relates to conferencing services, and forwards the request from the VRU to a conference management system (CMS). The CMS determines whether the given caller is a conference host or a participant, and determines whether a participant has called in before the given caller and has provided a conference code that is related to the conference code entered by the given caller. Depending on the circumstances, the CMS can request either that a new conference be created relating to the conference code as entered by the given caller, or that the caller be entered into an existing conference. If a new conference is being created, it is assigned to one of a plurality of mixers, and a unique identifier is generated for the new conference and provided to the mixer and the VRU. A mixer identifier that uniquely identifies the mixer hosting the conference is provided to the VRU. A data store is loaded with the conference code, the unique identifier for the new conference, and the mixer identifier, and the VRU and the mixer are placed in audio communication to place the caller in the conference.

28 Claims, 8 Drawing Sheets

U.S. PATENT DOCUMENTS

| | | |
|---|---|---|
| 5,884,284 A | 3/1999 | Peters et al. |
| 5,987,112 A | 11/1999 | Chakravarti et al. |
| 6,035,027 A | 3/2000 | Alleman |
| 6,144,667 A | 11/2000 | Doshi et al. |
| 6,212,268 B1 | 4/2001 | Nielsen |
| 6,236,644 B1 | 5/2001 | Shuman et al. |
| 6,253,249 B1 | 6/2001 | Belzile |
| 6,307,928 B1 | 10/2001 | Yamasaki |
| 6,453,034 B1 | 9/2002 | Donovan et al. |
| 6,512,764 B1 | 1/2003 | Carew et al. |
| 6,549,229 B1 | 4/2003 | Kirby et al. |
| 6,594,257 B1 | 7/2003 | Doshi et al. |
| 6,693,661 B1 | 2/2004 | Vanderwilt et al. |
| 7,092,506 B1 * | 8/2006 | Bers et al. ............. 379/265.02 |
| 7,133,665 B1 | 11/2006 | Peon et al. |
| 7,298,834 B1 * | 11/2007 | Homeier et al. ........ 379/202.01 |
| 2001/0002927 A1 | 6/2001 | Detampel, Jr. et al. |
| 2002/0122391 A1 | 9/2002 | Shalit |
| 2002/0122544 A1 * | 9/2002 | Williams et al. ....... 379/207.02 |
| 2003/0026406 A1 | 2/2003 | Ernstrom et al. |
| 2003/0103468 A1 | 6/2003 | Seavers et al. |
| 2003/0185362 A1 | 10/2003 | Kim |
| 2004/0047461 A1 * | 3/2004 | Weisman et al. ....... 379/202.01 |
| 2004/0062210 A1 | 4/2004 | Genter et al. |
| 2005/0007965 A1 * | 1/2005 | Hagen et al. ................ 370/260 |
| 2005/0069114 A1 * | 3/2005 | Eran .................... 379/202.01 |

\* cited by examiner

Message Sequence Diagram:
Change of Entry Exit Announcemnet State

Message Sequence Diagram:
Lock/Unlock Conference

METHODS FOR ADMITTING CONFERENCE CALL HOSTS AND PARTICIPANTS INTO CONFERENCE CALLS

CROSS REFERENCE TO RELATED APPLICATIONS

This application claims the benefit of the filing date of U.S. provisional patent application Ser. No. 60/552,469, filed on 12 Mar. 2004 to the fullest extent permitted under 35 U.S.C. § 119(e), and the contents of such provisional patent application are incorporated by this reference as if set forth verbatim herein.

FIELD OF THE INVENTION

The present invention is generally related to conference calls and, more particularly, to admitting conference call hosts and participants into conference calls.

BACKGROUND OF THE INVENTION

There are various problems and limitations associated with admitting conference call hosts and participants into conference calls including a lack of efficiency in doing so. As such, what is needed is are methods for entering hosts and participants into new or existing conference calls that overcome such problems and limitations.

BRIEF SUMMARY OF THE INVENTION

In one embodiment, A method of entering a host into a new conference call, the method comprising at least the following: receiving a call from a given caller at a VRU, receiving at least a conference code from the given caller at the VRU, forwarding the conference code to a proxy server, sending a request to the proxy server to enter the given caller into a conference call, determining, by the proxy server, that the request from the VRU relates to conferencing services, forwarding, by the proxy server, the request to a conference management system, which comprises at least a data store and at least one interface server receiving the request, determining that the given caller is a conference host, determining that at least one participant has called in previously to the given caller and has provided a conference code that is at least related to the conference code entered by the given caller, requesting that a new conference be created that corresponds to the conference code entered by the given caller, assigning the new conference to one of a plurality of mixers, generating a unique identifier for the new conference, providing the unique identifier to the one mixer and the VRU, providing a mixer identifier that uniquely identifies the one mixer to the VRU, loading the data store with at least the conference code, the unique identifier for the new conference, and the mixer identifier, and placing the VRU and the one mixer in audio communication.

In another embodiment, method of entering a conference call participant into a new conference call, the method comprising at least the following: receiving a call from a given caller at a VRU, receiving at least a conference code from the given caller at the VRU, forwarding the conference code to a proxy server, sending a request to the proxy server to enter the given caller into a conference call, determining, by the proxy server, that the request from the VRU relates to conferencing services, forwarding, by the proxy server, the request to a conference management system, which comprises at least a data store and at least one interface server receiving the request, determining that the given caller is a conference participant, requesting that a new conference be created that corresponds to the conference code entered by the given caller, assigning the new conference to one of a plurality of mixers, generating a unique identifier for the new conference, providing the unique identifier to the one mixer and the VRU, providing a mixer identifier that uniquely identifies the one mixer to the VRU, loading the data store with at least the conference code, the unique identifier for the new conference, and the mixer identifier; and placing the VRU and the one mixer in audio communication.

In a further embodiment, method of entering a conference call participant into a new conference call, the method comprising at least the following: receiving a call from a given caller at a VRU, receiving at least a conference code from the given caller at the VRU, forwarding the conference code to a proxy server, sending a request to the proxy server to enter the given caller into a conference call, determining, by the proxy server, that the request from the VRU relates to conferencing services, forwarding, by the proxy server, the request to a conference management system, which comprises at least a data store and at least one interface server receiving the request, determining that the given caller is a conference participant, requesting that the given caller be placed on hold until a conference host associated with the conference code calls in, and when the conference host calls in, performing at least the following: assigning the new conference to one of a plurality of mixers, generating a unique identifier for the new conference, providing the unique identifier to the one mixer and the VRU, providing a mixer identifier that uniquely identifies the one mixer to the VRU, loading the data store with at least the conference code, the unique identifier for the new conference, and the mixer identifier, and placing the VRU and the one mixer in audio communication.

In yet another embodiment, method of entering a conference call participant into a new conference call, the method comprising at least the following: receiving a call from a given caller at a VRU, receiving at least a conference code from the given caller at the VRU, forwarding the conference code to a proxy server, sending a request to the proxy server to enter the given caller into a conference call, determining, by the proxy server, that the request from the VRU relates to conferencing services, forwarding, by the proxy server, the request to a conference management system, which comprises at least a data store and at least one interface server receiving the request, determining that the given caller is a conference participant, requesting that the given caller be connected with at least a further caller temporarily until a conference host associated with the conference code calls in, and when the conference host calls in, performing at least the following: assigning the new conference to one of a plurality of mixers, generating a unique identifier for the new conference, providing the unique identifier to the one mixer and the VRU, providing a mixer identifier that uniquely identifies the one mixer to the VRU, loading the data store with at least the conference code, the unique identifier for the new conference, and the mixer identifier, and placing the VRU and the one mixer in audio communication.

In yet a further embodiment, A method of entering a host into a new conference call, the method comprising at least the following: receiving a call from a given caller at a VRU, receiving at least a conference code from the given caller at the VRU, forwarding the conference code to a proxy server, sending a request to the proxy server to enter the given caller into a conference call, determining, by the proxy server, that the request from the VRU relates to conferencing services, forwarding, by the proxy server, the request to a conference management system, which comprises at least a data store and at least one interface server, wherein the interface server receives the request, determining that an existing conference is at least related to the conference code entered by the given caller, determining that the given caller is a conference host, obtaining from the data store at least the unique identifier for the existing new conference and the mixer identifier related to the mixer hosting the existing conference, and placing the VRU to which the given caller is connected and the mixer hosting the existing conference in audio communication.

In yet another embodiment, A method of entering a host into a new conference call, receiving a call from a caller at a VRU, receiving at least a conference code from the caller at the VRU, forwarding the conference code to a proxy server, sending a request to the proxy server to enter the caller into a conference call, determining, by the proxy server, that the request from the VRU relates to conferencing services, forwarding, by the proxy server, the request to a conference management system, which comprises at least a data store and at least one interface server, wherein the interface server receives the request, determining that no existing conference corresponds to the conference code entered by the caller, determining that the caller is a conference host, requesting that a new conference be created that corresponds to the conference code entered by the caller, assigning the new conference to one of a plurality of mixers, generating a unique identifier for the new conference, providing the unique identifier to the one mixer and the VRU, providing a mixer identifier that uniquely identifies the one mixer to the VRU, loading the data store with at least the conference code, the unique identifier for the new conference, and the mixer identifier, and placing the VRU and the one mixer in audio communication.

BRIEF DESCRIPTIONS OF THE DRAWING FIGURES

DETAILED DESCRIPTION OF ILLUSTRATIVE EMBODIMENTS

Overview

Figure 8:
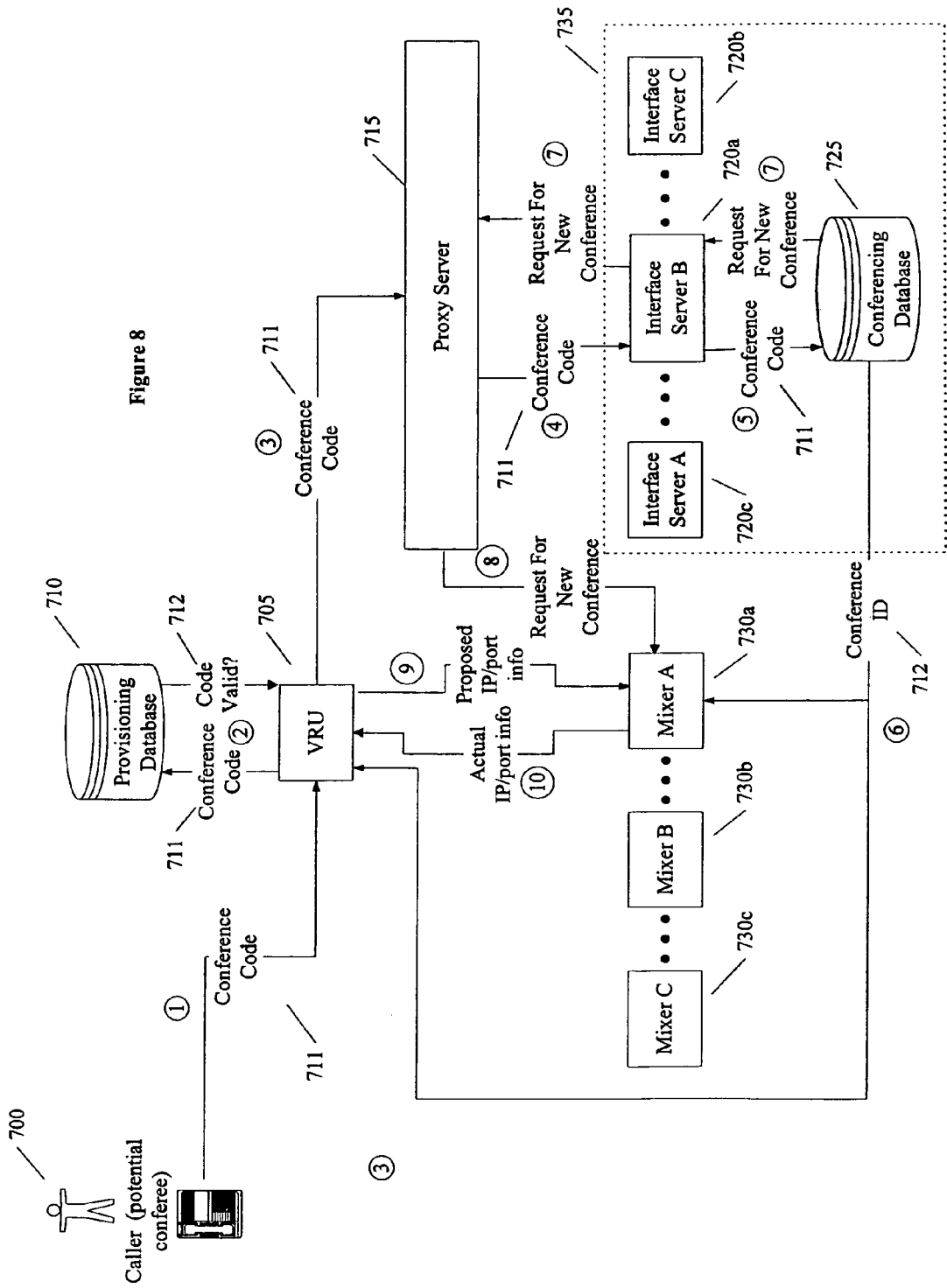
FIG. 8 is a block diagram of various component and data flows related to a representative overall conference call flow provided according to the instant invention.

FIG. 8 is a block diagram illustrating components and data flows associated with a. Some of the data flows shown in FIG. 8 can be accomplished using messages passed between the various components via a proxy server 115. However, to promote clarity and conciseness, and to avoid overcrowding in FIG. 8, some of these data flows are shown as bypassing the proxy server 115, when some of these flows may indeed pass through the proxy server 115. Thus, the data flows appearing in FIG. 8 (and all other drawings herein) are chosen for expository convenience only, and do not limit the instant invention.

To facilitate understanding of an illustrative but non-limiting sequence of processing shown in FIG. 8, sequence numbers appear in FIG. 8 inside circles, and these sequence numbers correspond to the paragraph numbers herein.

Caller into New Conference

1. Turning to FIG. 8, a caller 700 dials a predefined access number to request access to a conference call. The caller 700 can be either a conference host or a conference participant, as those terms are used and defined herein. The request from the caller 700 can be routed to a VRU 705, which obtains a passcode or other host-specific conference code 711 from the caller 700. The term "passcode" or "conference code" 711 refers to any unique identifier associated with the conference call host to identify conferences associated with a given conference call host to the exclusion of conferences associated with all other conference call hosts. Having obtained the passcode/conference code 711 or other host-specific conference code, the VRU 705 can forward this code 711 to other components for further processing as discussed below. The caller 700 can be prompted to enter a conference code 711 (e.g., manually or verbally through a communications device), or more generally, the VRU 705 can prompt the caller 700 to enter a passcode, a conference code, or other conference configuration information. Typically, the caller 700 will respond to these prompts by keying in the requested data via DTMF input or by speaking the requested codes. In the latter case, a speech recognition engine (readily available from a variety of vendors) may be deployed to process speech input from the caller 700. Generally, if the caller 700 responds with a conference code 711, that code can pass directly to the VRU 705, or can pass through any number of intermediate components between the VRU 705 and the caller 700.

2. The VRU 705 can forward the conference code 711 to a provisioning database 710 for validity checking. The provisioning database 710 can be populated when conference hosts enroll for conferencing services and thus receive conferencing codes 711. The conference hosts in turn provide conferencing codes or participant codes to the persons who are invited to join a given conference call. The provisioning database 710 responds to the VRU 705 with a signal 712 indicating the validity or invalidity of the conference code 711 submitted by the VRU 705. If the conference code 711 submitted by the VRU 705 is invalid, the VRU 705 can re-prompt the caller 700 to reenter the conference code 711 (not shown explicitly in FIG. 8), and can repeat this process for a reasonable number of times. However, if the caller 700 fails to enter a valid conference code 711 within this time frame, the interaction between the VRU 705 and the caller 700 will be terminated, or the caller 700 will be forwarded to a live human operator for resolution.

3. If the conference code 711 submitted by the VRU 705 is valid, the VRU 705 passes a message referencing the conference code 711 to a proxy server 715 requesting that the caller 700 be added to a conference. Those skilled in the art can construct the proxy server 715 to realize the functions described herein using, for example, a general-purpose personal computer (PC) running, e.g., an operating system such as any of the Windows™ family of operating systems, Linux™, or UniX™, or the like. The proxy server 715 can also run application software, including at least software relating to supporting Session Initiated Protocol (SIP)-based conferencing and/or telephony. Software suitable for these purposes is commercially available from, e.g., Vail Systems, Inc. (www.vailsys.com). The proxy server 715 maintains a list of all active interface servers 720a, 720b, and 720c (referenced collectively as interface server 720), and also tracks the loads currently being supported by each interface server 720. The interface servers 720 function at least in part to support pipes or queues that contain requests to be acted upon by a conferencing database 725. These pipes or queues can assume any characteristic or type known to those skilled in the art, including but not limited to FIFO, LIFO, or other types of data structures. The interface servers 720 can be implemented to realize the functions described herein using general-purpose server hardware available from a variety of vendors. The proxy server 715 keeps running counts of pending message requests pending or awaiting on each interface server 720. With this data, the proxy server 715 can perform load balancing across each of the various interface servers 720. The conferencing database 725 can then select requests from various ones of the queues supported by the various interface servers 720 for action. The results of such action can be posted or stored in a results queue or other data structure.

4. The proxy server 715 determines that the message referencing the conference code 711 incoming from the VRU 705 should be processed by the conferencing system 735, which comprises at least the interface servers 720 and the conferencing database 725. The conferencing database 725 tracks state or status data for each conference currently active at any given time. Illustrative but non-limiting examples of the types of data generated or tracked by the conferencing database 725 can include, but are not limited to: a unique identifier associated with each conference, identifying each conference to the exclusion of all others; a lecture-only flag as applicable to each conference; a record flag indicating whether the conference is to be or is being recorded; a unique identifier indicating the mixer 730 assigned to support each conference; one or more conference keys associated with hosts 100 or participants 404a or 404b engaged in various conferences. For each conference supported by the conferencing database 725, as the status of each conference changes, the conference database 725 tracks each change in status in a state table or other suitable data structure.

The proxy server 715 selects an available interface server 720 (either 720a, 720b, or 720c), and forwards the incoming message referencing the conference code 711 to the selected interface server 720a. FIG. 8 shows three interface servers 720a, 720b, and 720c for convenience in illustrating the concepts of load balancing and redundancy. However, this arrangement is not mandatory or critical to the instant invention, and various embodiments of the invention may deploy one or more interface servers 720, depending on the requirements and circumstances of a given application of the instant invention.

The proxy server 715 maintains an active list of each SIP-enabled device currently operative within the system shown in FIG. 8. Each SIP-enabled device is required to register with the proxy server 715 upon start-up, and to provide thereafter "heartbeat" messages periodically (e.g., once every "x" seconds) to the proxy server 715. In this manner, the proxy server 715 can determine which SIP devices are currently up and running, and further knows the current status of each SIP device. If the proxy server 715 does not receive a "heartbeat" message from a given SIP device after expiration of a predetermined time interval (e.g., once every "x" seconds), thus indicates to the proxy server 715 that the given SIP device may be inoperative. The proxy server 715 can then route future requests or commands to SIP devices that function as back-up devices to the apparently inoperative SIP device.

5. The conferencing system 735 then determines if a conference associated with the input conference code 711 already exists, by checking for an entry in the conferencing database 725 referencing the input conference code 711. If the conferencing database 725 contains no reference to the input conference code 711, the conferencing system 735 will request that a new conference be created, and the conference database 725 will generate a new unique conference identifier 712 for the new conference. The conferencing system 735 will then associate the newly generated conference identifier 712 with the conference code 711 input by the VRU 705.

6. The new unique conference identifier 712 can be forwarded to the VRU 705 and/or to the mixer (730a, 730b, or 730c) that is selected (discussed below) to host the new conference. The VRU 705 can then associate all future callers 700 who provide the given conference code 711 (or a code associated with the code 711) with the new unique conference identifier 712, and can thus use this relationship between the conference code 711 and the conference ID 712 to connect these future callers to the appropriate mixer 730 that is hosting the conference sought by such future callers.

7. Via a new-conference-request message or other suitable mechanism, the conferencing system 735 requests that the proxy server 715 select a mixer 730 (from among e.g., the mixers 730a, 730b, or 730c) to host the new conference, which will be associated with the newly created unique conference identifier 712. If necessary, the conferencing database 725 can stall the VRU 705 with a temporary acknowledgement command or other similar messaging mechanism (not shown in FIG. 8) in order to "buy" more time to respond to the VRU's original request, i.e., to add the caller 700 to a conference. While FIG. 8 shows this request passing through an interface server 720a for convenience in illustration and discussion, in some embodiments of the invention, this message may pass directly to the proxy server 715 and thus bypass the interface server 720a.

8. The proxy server 715 selects one of the mixers 730a, 730b, or 730c to host the new conference. This selection can be made based upon present mixer load and/or capacity (determined using any suitable algorithm), mixer calls, or other applicable criteria. The mixers 730 can be implemented using, e.g., a general-purpose server or computer including one or more microprocessors and any hardware necessary to support VoIP, or more generally, packet-based communications (e.g., one or more specialized voice-processing boards such as those commercially available from Dialogic, a subsidiary of Intel Corporation), running a suitable operating system (e.g., Unix™, Linux™, any of the Windows™ family, or the like), and running suitable application software, including at least conference mixing software available from Vail Systems, Inc., as referenced above. The proxy server 715 forwards the "new conference" request to the selected mixer, e.g., mixer 730a. The proxy server 715 maintains data indicating the current status of each of the mixers 730a, 730b, and 730c (collectively 730), as discussed above with other SIP devices. Maintaining status in this manner allows the proxy server 715 to perform load balancing among the various mixers 730, similar to the load balancing described above in connection with the interface servers 720, and also prevents the proxy server 715 from sending conference requests to a "dead" mixer 730. The same comments above directed to the illustrative number of interface servers 720 apply equally to the number of mixers 730 shown in FIG. 8.

If the selected mixer 730a can create the new conference, it does so and returns an acknowledgement message (not shown) to the conferencing database 725 via the proxy server 715. Otherwise if the selected mixer 730a cannot create the new conference, it returns a negative acknowledgement to the conferencing database 725 via the proxy server 715. In the latter instance, the proxy server 715 would then select a different mixer (e.g., mixer 730b or 730c) to host the new conference. In any event, once a suitable mixer 730 is located to host the new conference, the conferencing database 725 is updated to show that the new conference is now assigned to the selected mixer 730a. A unique identifier corresponding to the selected mixer 730a is stored with the conference code 711 and/or the conference identifier 712, thereby associating the conference with the mixer 730a. The conferencing database 725 can then provide the unique conference identifier 712 to the selected mixer 730a and to the VRU 705, and also instructs the VRU 705 to connect the caller 700 to the selected mixer 730a.

9. In response to the command from the conferencing database 725 to connect the caller 700 to the selected mixer 730a, the VRU 705 sends a proposed set of IP/port data to the selected mixer 730a (via the proxy server 715) for routing the conference stream data (the data representing the verbal or other interactions exchanged between conferees) between the VRU 705 and the selected mixer 730a. The VRU 705 also indicates whether the caller 700 is a conference host 100. In some embodiments of the instant invention, the conference will not actually begin until the host 100 associated with the conference code 711 provided by the VRU 705 has dialed into the conference. Until that happens, the various participants calling into the conference may be put on hold, but not actually bridged together into a conference until the host calls in.

10. The selected mixer 730a responds to the VRU 705 with the actual IP/port information that will be used for passing conferencing-related media between the mixer 730a and the VRU 705 for communication with the caller 700. The mixer 730a also provides the VRU 705 with information relating to any media descriptions or coders-decoders (codecs) that the VRU 705 may need to process the conferencing stream as passed between the caller 700 and the selected mixer 730a, via the VRU 705. Upon receiving this response from the selected mixer 730a, the VRU 705 configures itself to receive the conferencing stream, e.g., by activating its RTP stream, and the caller 700 is now in the conference. "RTP" stands for real time transport protocol, which is an IETF standard for streaming real time multimedia over an IP network in packets. At this point, the VRU 705 and the selected mixer 730a are now connected via a local area network. Thus, each caller 700 that calls into a conference may reach the VRU 705 via a circuit-switched network (not shown), but the link between the VRU 705 and the selected mixer 730 can be via a packet-switched (e.g., VoIP) network. The participants, 404a and 404b, and the host 100 can dial-in to a conference via different ports on the VRU 705, or even via different VRUs 705 altogether, but will all be linked to a given mixer 730, e.g., mixer 730a.

The conferencing database 725 is updated to show that the VRU 705 and the caller 700 are in the conference, and the status of each of the various devices discussed herein, as well as the overall status of the conference itself, are updated with the conferencing database 725 periodically.

Caller Into Existing Conference

If the caller 700 is dialing into an already-existing conference, the same method as discussed above is performed, up to paragraph 5, where the conferencing database 725 checks for an existing conference associated with the input conference code 711. If the conferencing database 725 locates an existing conference identifier 712 corresponding to the conference code 711 submitted by the VRU 705, the conference database 725 knows that the conference sought by the caller 700 currently exists. In this case, the conferencing database 725 then forwards to the VRU 705 the identifier of the mixer 730a that is hosting the existing conference. The VRU 705 then sends an "invite" message to the selected mixer 730a. The selected mixer 730a responds with the IP/port data that the mixer 730a will use for transmitting the conference stream media to the caller 700 via the VRU 705. The VRU 705 then activates its RTP stream and the caller 700 is now in the conference. The conferencing database 725 is updated accordingly to reflect that the caller 700 is in the conference.

Message Sequence Diagrams

Having provided the above overview of the components, architecture, and message flow of the instant conferencing system and method in connection with FIG. 8, the discussion now turns to the message sequence diagrams shown in FIGS. 1-7.

This portion of the detailed description references sequence diagrams that specify the messages sent between the VRU 705, Conference Management System (CMS) 735, Mixer(s) 730, Database 725, and SIP proxy server 715. At least the following cases are diagrammed and/or discussed herein:

1. 1. New Conference Setup
2. 2. Additional Conferee joins an existing conference
3. 3. Conference Participant Hangs Up
4. 4. Host Hangs Up
5. 5. Host Mutes or Unmutes all participants
6. 6. Host mutes or un-mutes an individual, selected participant
7. 7. Host sets entry/exit announcement state
8. 8. Host locks/unlocks conference
9. 9. Host Deletes an individual participant
10. 10. Host sets host-hang-up Behavior
11. 11. Host Requests Roll-Call
12. 12. Host Requests Participant Count
13. 13. Host Requests that Conference be Recorded
14. 14. The CMS 735 Ends Conference
15. 15. Participant Drops Unexpectedly
16. 16. Mixer Crashes
17. 17. Mixer Heartbeat
18. 18. Registration Procedures
19. 19. Outdial The instant discussion describes illustrative embodiments of conferencing apparatus and related methods using the known Session Initiation Protocol (SIP). Note that the illustrative SIP messages shown here are examples chosen for expository convenience only and do not limit the instant invention.

1. New Conference Setup

When a host enrolls for conferencing services, he or she may specify at least one parameter applicable to a conference involving the host. Those parameters that are not explicitly specified may be set to a default value by the application, based on a profile associated with the host code 711 used to request a particular conference. Each of the parameters can be placed in a separate header field in the SIP INVITE message. The host can specify the conference parameters (e.g., those shown in Table 1 below) on a per-conference basis. If a particular field is not present, a default value can be used.

TABLE 1

| Parameter (Header Field Name) | Possible Values |
| --- | --- |
| x-on-hold-music-url | A URL of a file to use for the music track. Use the string "standard" to specify standard music. Will default to no music if header not present. |
| x-periodic-message-url | A URL of a file to use for the periodic on-hold message. Use the string "standard" to play a standard message. Will default to no periodic message if header not present. |
| x-upsell-message-url | A URL of a file to play once to a participant while holding. Will default to no upsell message if header is not present. |
| x-entry | One of: None, Name, Tone, NameAndTone. Will default to Tone if |
| x-exit | header is not present. Note they are separate headers. |
| x-lecture-only-flag | One of: On, Off. Will default to Off if header is not present. |
| x-record-flag | One of: On, Off. Will default to Off if header is not present. |
| x-max-hold-time | Max # of seconds to allow participants to hold for this conference while waiting for the host to arrive. Value 0 means can't hold at all, host must join first. Will default to 10 minutes if header is not present. |
| x-max-wrap-time | Max # of seconds to allow participants to continue on bridge after host leaves. Value of 0 indicates conference terminates immediately when host leaves. Will default to 20 minutes if header is not present. |

The various message flows shown in the various drawing figures are numbered for ease of reference, and these flows are discussed herein.

Figure 1:
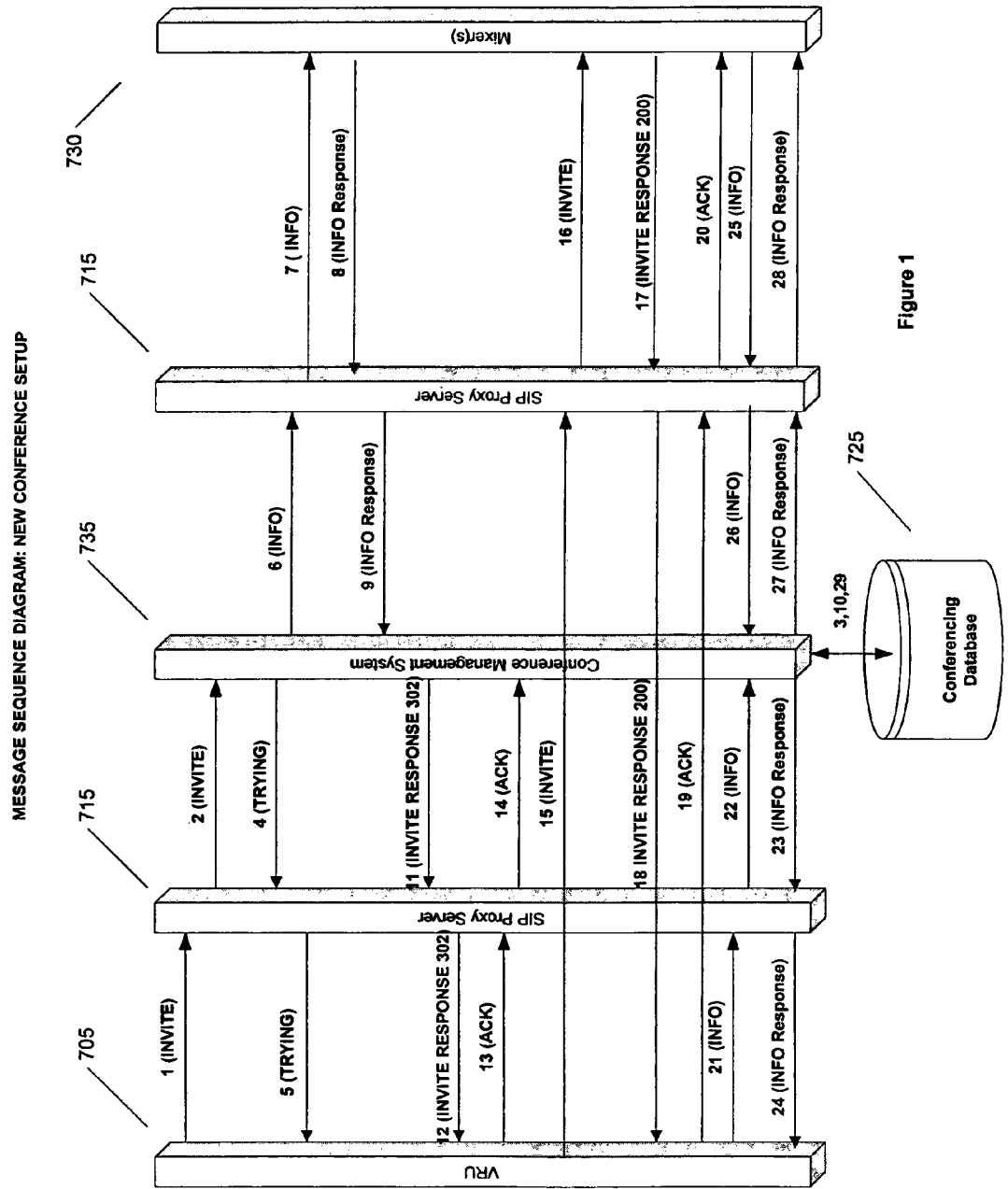
FIG. 1 is a diagram of an illustrative message sequence suitable for establishing a new conference.

Turning to FIG. 1:

1. The VRU 705 receives a call from the caller. In response to prompts from the VRU 705, the caller 700 enters his or her PIN (user-specified or system-specified), other optional information relating to conference configuration, and the conference code (e.g., 577342), which can be either a host code or a participant code. The VRU 705 sends an SIP INVITE message to the proxy server 715. In FIG. 1, the proxy server 715 appears twice, but this representation is only to avoid over-crowding and confusion in the message sequence diagrams. The two blocks labeled 715 can represent one proxy server 715.

This INVITE message may take the following illustrative but non-limiting form:

INVITE sip:proxy1.string1.com SIP/2.0
Via: SIP/2.0/UDP eos2002.string1.com
From: sip:sipdaemon@eos2002.string1.com
To: sip:orchestra@string1.com
Call-ID: 2002331059963@eos2002.string1.com
Content-Length: 307
Content-Type: application/sdp
x-host-code: 577342
x-participant-code: 577343 (looked up by the VRU)
x-max-hold-time: 1200
x-max_wrap-time: 0
x-entry: NameAndTone
x-participant-type: Host
x-client: att
x-site: Denver
x-email-notify: Y
x-email-address: bigguy@company.com
x-phone: 3321147

String 1 represents a string that can, for example identify a particular client or company deploying the instant invention, and may comprise at least in part, a URL address.

The invite message can contain data related to specifying parameters related to the known Session Description Protocol (SDP), such the conferencing media type (e.g., audio), parameters relating to any coders/decoders (codecs) used in connection with the media, and one or more transport addresses related to the conference.

2. The Proxy Server 715 determines that this message is for the conference management system (CMS) 735, selects an available interface server 720, and forwards the INVITE message to the selected interface server 720. Assume that the interface 720a shown in FIG. 8 is chosen. This INVITE message as forwarded to the interface server 720a can take the following illustrative form:

INVITE sip:orchestra1.string1.com SIP/2.0
Via: sip:proxy1.string1.com
Via: SIP/2.0/UDP eos2002.string1.com
From: sip:sipdaemon@eos2002.string1.com
To: sip:CMS@string1.com
Call-ID: 2002331059963@eos2002.string1.com
Content-Length: 6207
Content-Type: application/sdp
x-host-code: 577342
x-max-hold-time: 1200
x-max_wrap-time: 0
x-entry: NameAndTone
x-participant-type: Host
x-client: att
x-site: Denver
x-email-notify: Y
x-email-address: bigguy@company.com
x-phone: 3321147

3. The CMS 735 accesses the conferencing database 725 to determine whether a conference corresponding to the input conference code 711 already exists, or should now be created. In this case, assume a new conference should be created. The CMS 735 determines it needs to create a new conference, and based on the input conference code 711, it also determines that it needs to use e.g., a "Class A" mixer to host the new conference. Various classes of mixers are discussed below. The CMS 735 also generates a globally unique conference string that identifies this new conference. For this example, assume the CMS 735 generates the conference string "3xyza1077fkdda". This string will be passed to the chosen mixer 720 and to the VRU 705 to identify the particular conference to which the caller 700 (i.e., host 100) should be joined. Subsequent callers 700 who enter a participant code or conference code 711 that corresponds to the same conference will be associated with the same unique conference identifier. Since the CMS 735 will have to contact the mixer 730 to create the new conference, which might take time, the CMS 735 determines that it may need to send a TRYING response to the VRU 705.

4. The CMS 735 sends back to the VRU 705 a 100 Trying message, which is considered a response to the INVITE request sent previously by the VRU 705 in step 1 above. While not strictly necessary, it may be preferable to do this as it buys more time for the CMS 735 to perform its task without the VRU 705 thinking that the CMS 735 has become inoperative. In this step, the response can go from the CMS 735 to the proxy server 715. The TRYING 100 message can take the following illustrative form:

SIP/2.0 100 TRYING
    Via: sip:proxy1.string1.com
    Via: SIP/2.0/UDP eos2002.string1.com
    From: sip:sipdaemon@eos2002.string1.com
    To: sip:CMS@string1.com
    Call-ID: 2002331059963@eos2002.string1.com 5. The proxy server 715 can forward the TRYING response to the VRU 705 to "stall" the VRU 705, using the following illustrative form:

SIP/2.0 100 TRYING
    Via: SIP/2.0/UDP eos2002.string1.com
    From: sip:sipdaemon@eos2002.string1.com
    To: sip:CMS@string1.com
    Call-ID: 2002331059963@eos2002.string1.com 6. To request creation of the new conference, the CMS 735 can send the following SIP message to the proxy server 715, which can in turn forward this message to one or more mixers 730. This message can take the following form:

INFO sip:proxy1.string1.com SIP/2.0
    Via: SIP/2.0/UDP CMS.string1.com
    From: sip:CMS@string1.com
    To: sip:mixerA@string1.com
    Call-ID: 2002331059963@CMS1.string1.com
    x-command: CreateNewConference
    x-conference-id: 3xyza1077fkdda
    x-entry: NameAndTone
    x-exit: Tone
    x-lecture-only-flag: N
    x-record-flag: N
    x-participant-type: Host 7. The proxy server 715 receives the message sent in the previous step, and in response thereto, selects a mixer 730 to hose the new conference. Assuming the new conference should be hosted on a "type A" mixer 730, the proxy server 715 searches for a mixer 730 that registered as, e.g., a mixer of type "mixer-A" that is least loaded and forwards the INFO message as shown below. In this case, assume that the proxy server 715 selected a mixer 730a identified by the string "mixer13.string1.com" as the least loaded mixer of the type "mixer-A", and sends the selected mixer 730a a message taking the following illustrative form:

INFO sip:mixer13.string1.com SIP/2.0
    Via: SIP/2.0/UDP proxy1.string1.com
    Via: SIP/2.0/UDP CMS1.string1.com
    From: sip:CMS@string1.com
    To: sip:mixerA@mixer13.string1.com
    Call-ID: 2002331059963@CMS1.string1.com
    x-command: CreateNewConference
    x-conference-id: 3xyza1077fkdda
    x-entry: NameAndTone
    x-exit: Tone
    x-lecture-only-flag: N
    x-record-flag: N
    x-participant-type: Host 8. The selected mixer 730a sees from the INFO message above that a new conference is to be created using conference identifier "3xyza1077fkdda". The mixer 730a can then establish the new conference internally and initialize it based on the parameters specified in the INFO message. It can then send a 200 OK message to the proxy server 715 in the following illustrative form:

SIP/2.0 200 OK
    Via: SIP/2.0/UDP proxy1.string1.com
    Via: SIP/2.0/UDP CMS1.string1.com
    To: sip:mixerA@mixer13.string1.com
    From: sip:CMS@string1.com
    Call-ID: 2002331059963@CMS.string1.com
    x-command: CreateNewConference
    x-conference-id: 3xyza1077fkdda
    x-max-hold-time: 1200
    x-max_wrap-time: 0
    x-entry: NameAndTone The selected mixer 730a can use the above 200 OK response to indicate that it accepts the request for a new conference. If for any reason it could not establish the new conference, it would use one of the SIP failure response codes (for example, 480 or 486).

9. The INFO response message from the previous step is forwarded by the proxy server 715 back to the CMS 735.

10. The CMS 735 updates the conferencing database 725 to reflect that a new conference associated with the unique conference identifier "3xyza1077fkdda" is hosted on the selected mixer 730a, which is identified by the unique mixer string.

11. After the CMS 735 updates the conferencing database 725, it sends a 302 response message to the VRU 705 (via the proxy server 715), taking the following illustrative form:

SIP/2.0 302 Moved Temporarily
    Via: sip:proxy1.string1.com
    Via: SIP/2.0/UDP eos2002.string1.com
    To: sip:CMS@CMS1.string1.com
    From: sip:sdpdaemon@eos2002.string1.com
    Call-ID: 2002331059963@eos2002.string1.com
    Contact: sip:mixer13.string1.com
    x-conference-id: 3xyza1077fkdda
    x-max-hold-time: 1200
    x-max_wrap-time: 0
    x-entry: NameAndTone
    x-exit: Tone
    x-participant-type: Host
    x-attendee-id: 1

At this point, the VRU 705 knows that it should send the INVITE message to the selected mixer 730a and that it should use the conference identifier string (conference-id) "3xyza1077fkdda" and attendee-identifier (attendee-id) "1" in connection with the given conference and the given conferee, respectively. The conference-id and attendee-id are generated by the CMS 735 and sent back to the mixer 730 in the above 302 response. The VRU 705 copies these new headers into the INVITE message that it sends directly to the selected mixer 730a in step 15 below.

12. The Moved Temporarily 302 message from the previous step is forwarded from the proxy server 715 to the VRU 705.

13. The VRU 705 acknowledges (ACKS) the INVITE response that the CMS 735 sent.

14. The ACK request is forwarded from the proxy server 715 to the CMS 735.

15. The VRU 705 sends an INVITE message to the selected mixer 730a, via the proxy server 715. This INVITE message contains the IP/port information proposed by the VRU 705 for the RTP/RTCP stream that will comprise the conferencing stream going to and from the caller 700. Also, note that the INVITE message that the VRU 705 sends to the mixer 730 contains the header x-string1-participant-type. Preferably, this header specifies whether the caller 700 is a host 100. In some embodiments of the instant invention, if this header is absent, the mixer 730 will assume that the incoming caller 700 is not the host. In these embodiments, the mixer 730 needs to know when the host 100 arrives, because if participants call in before the host 100, they will be put on hold but not bridged together. Other alternative embodiments for handling a scenario wherein the participants call in before the host 100 are discussed below. The INVITE message can take the following illustrative form:

INVITE sip:proxy1.string1.com SIP/2.0
    Via: SIP/2.0/UDP eos2002.string1.com
    From: sip:sipdaemon@eos2002.string1.com
    To: mixerA@mixer13.string1.com
    CALL-ID: 2002331059963@eos2002.string1.com
    Content-Length: 307
    Content-Type: application/sdp
    x-Conference-id: 3xyza1077fkdda
    x-entry: NameAndTone
    x-exit: Tone
    x-participant-type: Host
    x-max-hold-time: 1200
    x-max_wrap-time: 0
    x-attendee-id: 1

The entity body of this message can contain the transport address, media type, and codec parameters in the SDP.

16. The proxy server 715 receives the INVITE message sent in the previous steps and forwards it to the selected mixer 730a.

17. The mixer 730a receives the INVITE message sent in the previous step, and sends a response to that message back to the proxy server 715. This time, the SDP in the entity body contains data representing the IP address and port that the mixer 730 will use for the RTP/RTCP data comprising the conferencing voice stream, along with the description of the media (codec) that the mixer 730 will send back to the VRU 705. The response sent by the mixer 730 back to the proxy server 715 can take the following illustrative form:

SIP/2.0 200 OK
    Via: SIP/2.0/UDP proxy1.string1.com
    Via: SIP/2.0/UDP eos2002.string1.com
    To: sip:mixerA@mixer13.string1.com
    From: sip:sipdaemon@eos2002.string1.com
    CALL-ID: 2002331059963@eos2002.string1.com
    Content-Length: 262
    Content-Type: application/sdp
    x-conference-id: 3xyza1077fkdda
    x-Max-Hold-Time: 1200
    x-Max_Wrap-Time: 0
    x-entry: NameAndTone
    x-exit: Tone
    x-attendee-id: 1
    x-participant-type: Host 18. The proxy server 715 forwards the response to the VRU 705. Once the VRU 705 activates its RTP stream the caller 700 is in the conference.

19. The VRU 705 ACKS the INVITE response received in the previous step, thereby confirming that the VRU 705 is in the conference.

20. The proxy server 715 forwards the ACK to the selected mixer 730a.

21-28. Now that the caller 700 has successfully been added to the conference, the conferencing database 725 is updated. Whenever the state of any conference between any VRU 705 and any mixer 730 changes, a SIP INFO message is sent to the CMS 735 so that the conferencing database 725 is updated on of the state of every conference. Thus, since the caller 700 has been added to the conference, the SIP INFO message is sent to the proxy server 715, which in turn will forward it to the CMS 735. If the VRU 705 had been unable to join the conference for some reason (e.g., no response or an error response from the mixer 730), it would inform the CMS 735 of this condition with a different INFO message. The SIP INFO message sent to the CMS 735 to update the conference status with the conferencing database 725 can take the following illustrative form:

INFO proxy1.string1.com SIP/2.0
    Via: SIP/2.0/UDP eos2002.string1.com
    From: sip:sipdaemon@eos2002.string1.com
    To: sip: CMS@string1.com
    Call-ID: 2002331059963@eos2002.string1.com
    x-command: StatusUpdate
    x-conference-id: 3xyza1077fkdda
    x-status-change: JoinedConference Note that both the VRU 705 and the mixer 730 can send INFO messages to the CMS 735. In each case, the INFO message can go through the proxy server 715, and, in each case, the CMS 735 can respond to the INFO message to confirm receipt.

29. The CMS 735 updates the conferencing database 725 to indicate that the caller 700, who is communicating through a given port of the VRU 705, is now in the conference.

2. Additional Conferee Joins an Existing Conference

Figure 2:
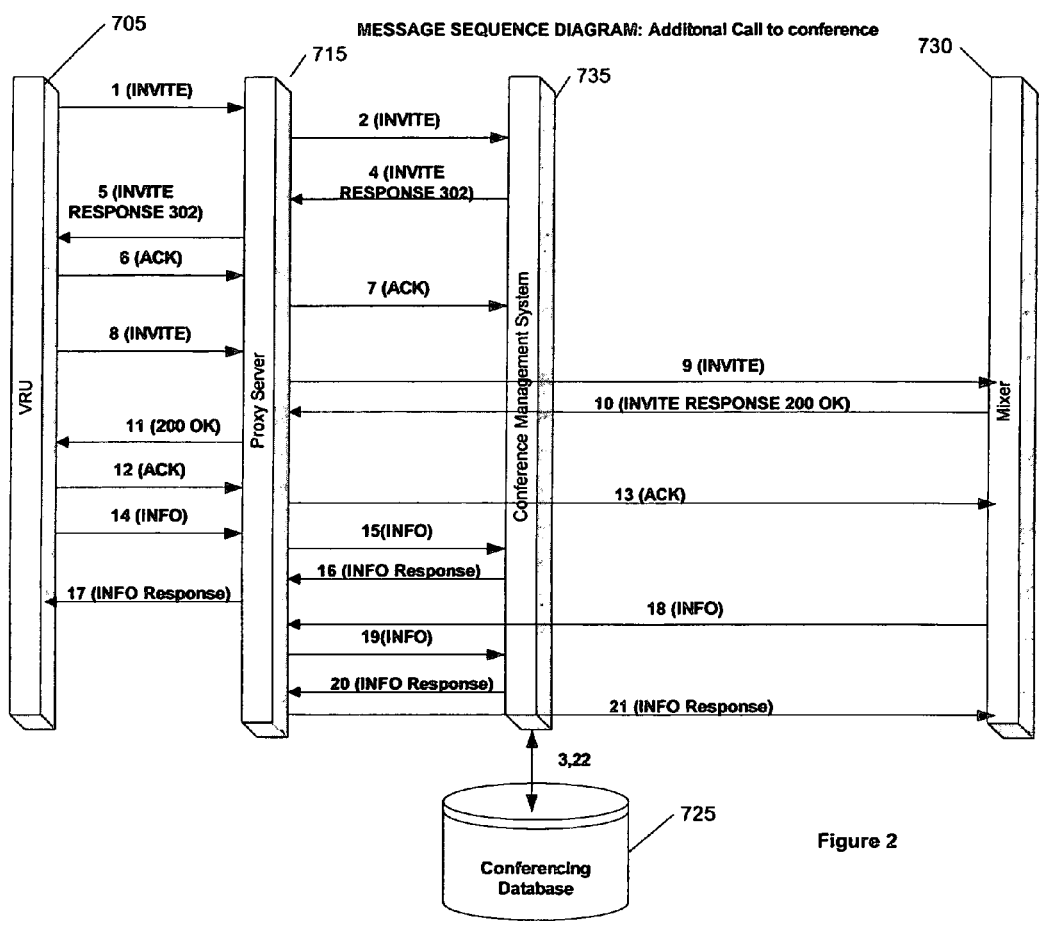
FIG. 2 is a diagram of an illustrative message sequence suitable for admitting at least one additional conference to an existing conference.

Turning to FIG. 2:

1. The caller 700 dials into the VRU 705, is authorized/authenticated by the VRU 705, and then enters his/her participant ID or conference key (collectively referenced as 711), which can be identical to or otherwise related to the conference key 711 supplied by the previous caller 700, as discussed in connection with FIG. 7. The VRU 705 sends an SIP INVITE message to the proxy server 715 taking the following general form:

INVITE sip:proxy1.string1.com SIP/2.0
    Via: SIP/2.0/UDP eos2002.string1.com
    From: sip:sipdaemon@eos2002.string1.com
    To: sip:CMS@string1.com
    Call-ID: 2002391069063@eos2002.string1.com
    Content-Length: 6207
    Content-Type: application/sdp
    x-host-code: 577342

2. The proxy server 715 forwards the above INVITE message and the conference key 711 input by the caller 700 in the previous step to an interface server 720 in the CMS 735. The interface server 720 can be selected as discussed above in connection with FIG. 1.

3. The CMS 735 receives the INVITE message sent in the previous step and the searches for the input conference key or code 711 in the conferencing database 725. The conferencing database 725 preferably contains an entry for the active conference corresponding to the input conference key, e.g., 577342. In the instant discussion, assume that the caller 700 discussed in connection with FIG. 2 wishes to join the new conference created in connection with FIG. 1. Thus, the CMS 735 will recognize that the conference sought by the caller 700 is an existing conference. The CMS 735 will further recognize that the unique conference identifier string for this existing conference is "3xyza1077fkdda", and that this existing conference is being hosted on the mixer 730 associated with the unique mixer identifier string "mixer13.string1.com".

4. Based on the information obtained in the previous step, the CMS 735 sends (via the proxy server 715) an INVITE response to the VRU 705 in the following illustrative form:

SIP/2.0 302 Moved Temporarily
    Via: SIP/2.0/UDP eos2002.string1.com

To: sip:CMS@CMS1string1.com
From: sip: sdpdaemon@eos2002.string1.com
Call-ID: 2002391069063@eos2002.string1.com
Contact: mixer13.string1.com
x-conference-id: 3xyza1077fkdda 5. The proxy server 715 forwards the INVITE response from the previous step to the VRU 705.

6. The VRU 705 receives the INVITE response sent in the previous step, and sends an acknowledgement (ACK) to the CMS 735 as a reply to the INVITE response.

7. The proxy server 715 forwards the ACK to the CMS 735.

8. The VRU 715 sends a new INVITE message, this time destined for the selected mixer 730a that is hosting the existing conference. The INVITE message can be transmitted via the proxy server 715, and can take the following illustrative form:

INVITE sip:proxy1.string1.com SIP/2.0
  Via: SIP/2.0/UDP eos2002.string1.com
  From: sip:sipdaemon@eos2002.string1.com
  To: mixerA@mixer13.string1.com
  Call-ID: 2002391069063@eos2002.string1.com
  Content-Length: 6207
  Content-Type: application/sdp
  x-conference-id: 3xyza1077fkdda 9. The proxy server 715 forwards the INVITE message to the selected mixer 730a.

10. The selected mixer 730a sends a response for the INVITE message back to the proxy server 715. This time, the transport address contained in the entity body (SDP) contains the IP and port that the mixer 730 will use for the RTP/RTCP data passing between the selected mixer 730a and the caller 700 via the VRU 705, once the caller is connected to the conference. This response can take the following illustrative form:

SIP/2.0 200 OK
  Via: SIP/2.0/UDP eos2002.string1.com
  To: sip:mixerA@mixer13.string1.com
  From: sip:sipdaemon@eos2002.string1.com
  Call-ID: 2002391069063@eos2002.string1.com
  x-conference-id: 3xyza1077fkdda
  Content-Length: 380
  Content-Type: application/sdp 11. The proxy server 715 forwards the message from the previous step to the VRU 705.

12. The VRU 705 sends an ACK request to the mixer 730 to acknowledge the INVITE Response sent by the mixer 730a in step 10.

13. The proxy server 715 forwards the ACK message to the selected mixer 730a.

14-21. Once the VRU 705 activates its RTP stream, the new caller 700 is in the conference. The VRU 705 sends an INFO message (via the proxy server 715) to the CMS 735 to inform the CMS 735 that the caller 700 was successfully added to the conference.

INFO proxy1.string1.com SIP/2.0
  Via: SIP/2.0/UDP eos2002.string1.com
  From: sip:sipdaemon@eos2002.string1.com
  To: sip: CMS@string1.com
  Call-ID: 2002391069063@eos2002.string1.com
  x-conference-id: 3xyza1077fkdda
  x-status-update: JoinedConference A similar INFO message is also sent from the selected mixer 730 to the CMS 735, and all the INFO messages are responded to as shown in the diagram.

22. The CMS 735 updates the conferencing database 725 to indicate that the additional conferee, the second caller 700, is now in the given conference.

3. Conference Participant Hangs Up

Figure 3:
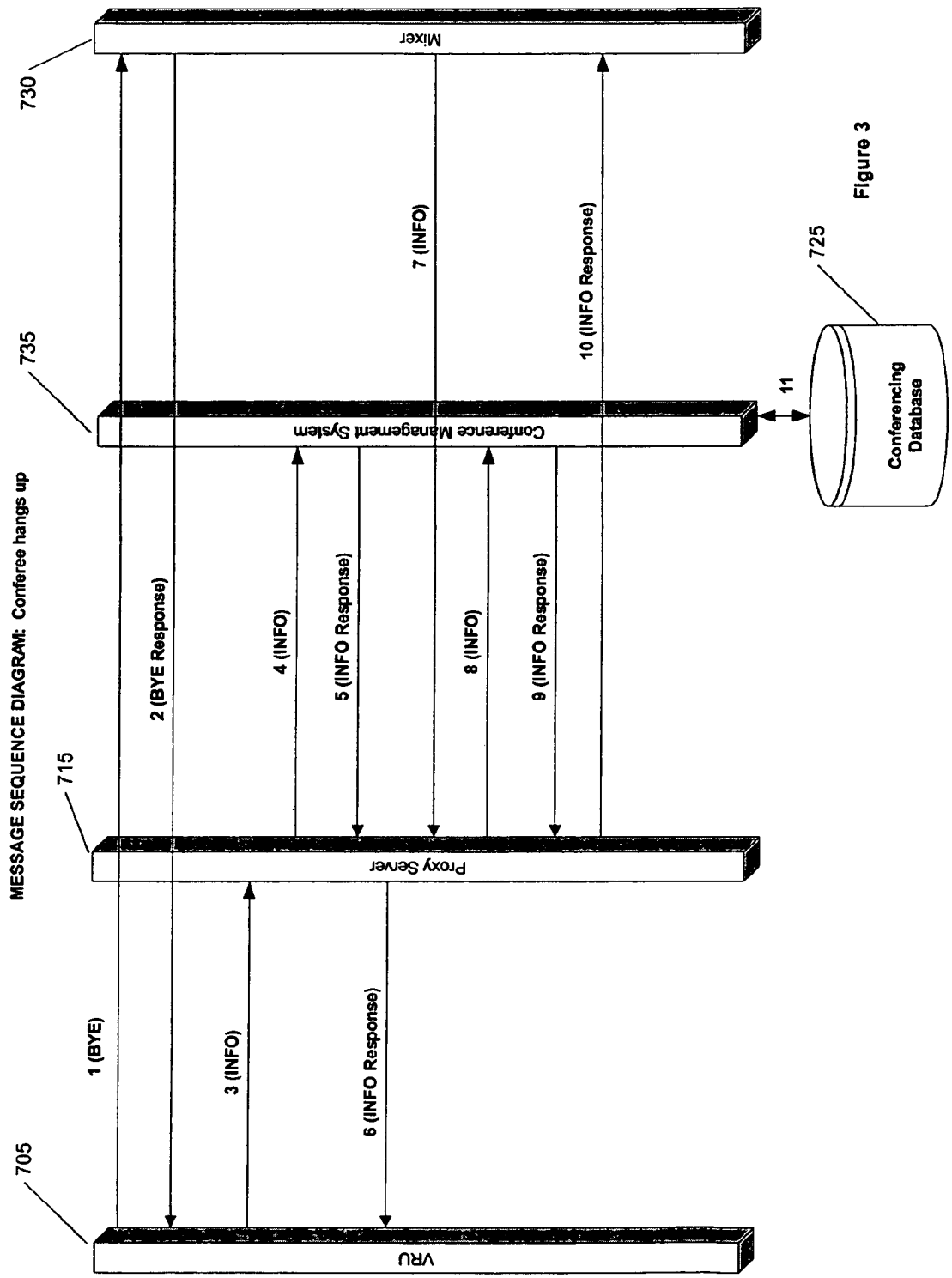
FIG. 3 is a diagram of an illustrative message sequence suitable for execution when a conference participant terminates a connection to the conference.

Turning to FIG. 3:

1. A given conferee, in this case a conference participant as opposed to the conference host, hangs up his or her handset, sending a disconnect signal to the VRU 705. Alternatively, the conferee can enter some DTMF signals instructing the conferencing application to disconnect or hang up on his/her behalf. The VRU 705 sends a BYE message to the mixer 730 hosting the given conference. Note that the BYE message can go directly to the mixer 730 without passing through a proxy server 715. The BYE message can take the following illustrative form:

BYE sip:mixerA@mixer13.string1.com SIP/2.0
  From: sip:sipdaemon@eos2002.string1.com
  To: mixerA@mixer13.string1.com
  Call-ID: 2002391069063@eos2002.string1.com
  x-conference-id: 3xyza1077fkdda The BYE message includes a caller identifier (Call-ID) that identifies the particular caller 700 after that caller 700 has been admitted to a given conference. Note that the Call-ID parameter in the BYE message preferably matches the one referenced in the original INVITE message sent by the VRU 705 to the mixer 730 when that caller 700 entered the conference. This convention enables the mixer 730 to identify exactly which conferee is leaving the conference and can enable the identification of the conferee as a participant rather than a host (e.g., by the database 725).

2. The mixer 730 hosting the conference removes the participant from the conference and sends the BYE Response message back to the VRU 705 through which the participant was communicating with the conference. Again, this message can be direct, i.e., without passing through the proxy server 715. This BYE message can take the following illustrative form:

SIP/2.0 200 OK
  To: sip:mixerA@mixer13.string1.com
  From: sip:sipdaemon@eos2002.string1.com
  Call-ID: 2002391069063eos2002.string1.com 3-10. The VRU 705 to which the given participant was connected sends an INFO message to the CMS 735 to indicate that the given participant has dropped from the conference. This message can take the following illustrative form:

INFO sip:proxy1.string1.com SIP/2.0
  From: sip:sipdaemon@eos2002.string1.com
  To: sip:CMS@string1.com
  Call-ID: 2002391069063@eos2002.string1.com
  x-conference-id: 3xyza1077fkdda
  x-status-update: LeftConference The mixer 730 hosting the conference from which the participant dropped can also send an INFO message to the CMS 735 to indicate that the given participant has dropped from the conference. This message can take the following illustrative form:

INFO sip:proxy1.string1.com SIP/2.0
  From: sip:mixerA@mixer13.string1.com
  To: sip:CMS@string1.com
  Call-ID: 2002391069063@eos2002.string1.com
  x-conference-id: 3xyza1077fkdda
  x-status-update: LeftConference These INFO messages can go through the proxy server 715, and can be responded to by the CMS 735 with INFO Response messages, as shown in FIG. 3.

11. The CMS 735 updates the conferencing database 725 to indicate the new state of the conference after the given participant has disconnected or hung up.

4. Host Hangs Up

Figure 4:
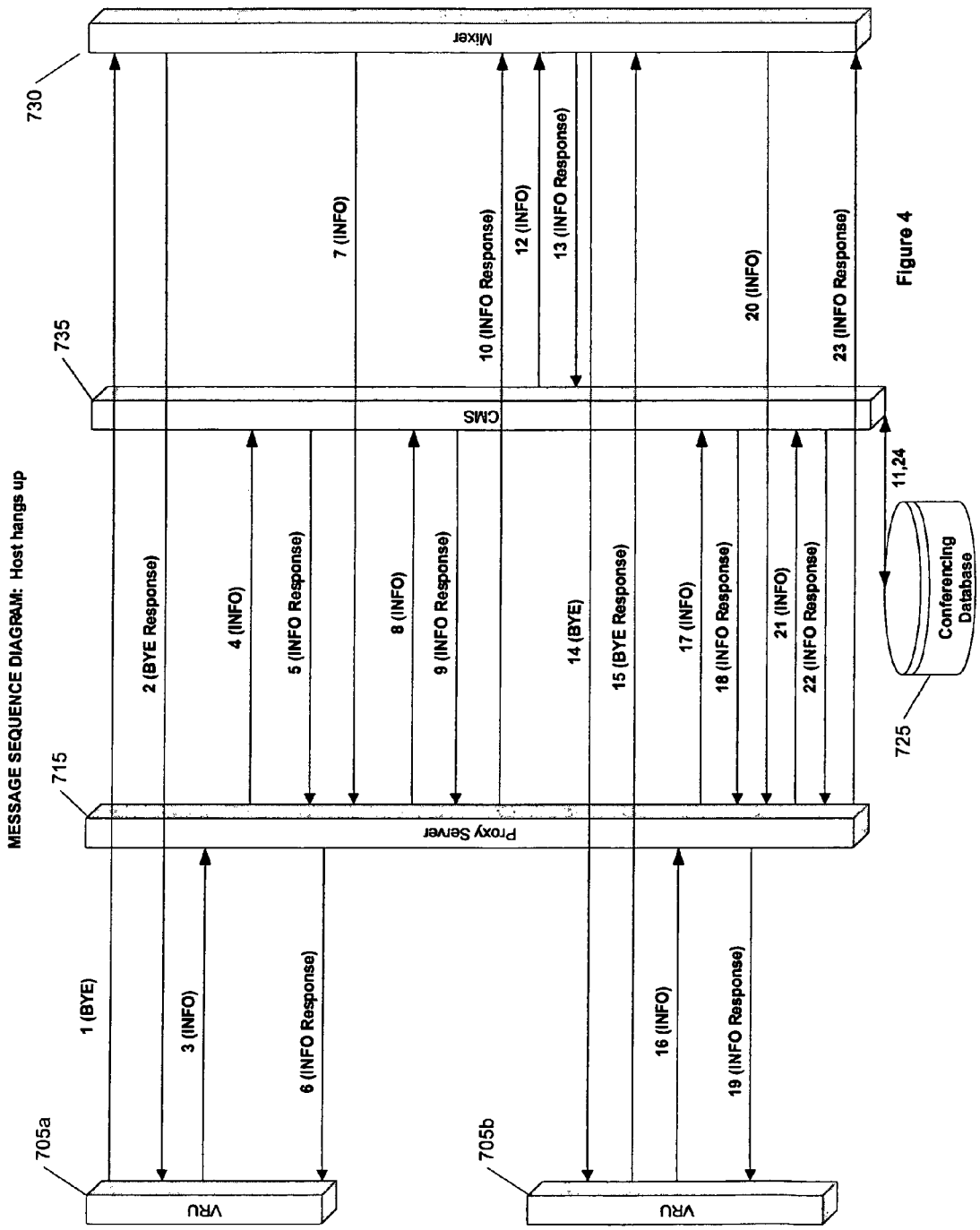
FIG. 4 is a diagram of an illustrative message sequence suitable for execution when a conference host terminates a connection to the conference.

Turning to FIG. 4:

1. The host (as opposed to one of the participants) hangs up his/her handset, sending a disconnect signal to the VRU 705 to which the host is/was connected. The VRU 705 sends a BYE message directly to the mixer 730 hosting the conference from which the host disconnected.

2. The mixer 730 removes the host and responds with a BYE Response message, sent directly to the VRU 705.

3-10. The VRU 705 sends an INFO message to the CMS 735 via the proxy server 715 informing the CMS 735 that the participant is out of the conference. At this point, the VRU 705 or the mixer 730 may not recognize whether the conferee who disconnected is a host or a participant. The mixer 730 also sends a similar message to the CMS 735. The CMS 735 responds via the proxy server 715 to each INFO message from the VRU 705 and the mixer 730.

11. The CMS 735 checks the conferencing database 725 and sees that the participant that just left the conference was the host, and sees furthermore that the conference is configured to end when the host leaves.

12. The CMS 735 sends an INFO message to the mixer 730 hosting the conference with a command to terminate the conference (e.g., x-Command: TerminateConference). The CMS 735 can wait a small amount of time, e.g. 5 seconds, before sending this message. This would allow non-host participants to say good-bye, etc., after the host hangs up, instead of being abruptly disconnected. A header (e.g., x-conference-id) is preferably included to specify which conference to terminate.

13. The mixer 730 responds with an INFO response message.

14. The mixer 730 goes through the list of all conferees (participants) remaining in the conference and sends each a BYE message to each conferee, via the VRU 705 ports through which one or more participants may be connected to the conference.

15. The VRU 705, upon receipt of the BYE message from the mixer 730, sends a BYE response back to the mixer 730.

16-23. The VRU 705b and the mixer 730 both send INFO messages (via the proxy server 715) to the CMS 735 to inform the CMS 735 that the various participants have left the conference.

24. The CMS 735 updates the conferencing database 725 to reflect that the various participants have been removed from the conference.

Note that steps 14 through 24 would be repeated for each remaining conferee in the conference. Note also that FIG. 4 includes two VRUs 705a and 705b to illustrate that different participants can access a given conference via different VRUs.

5. Host Mutes or Unmutes all participants

The VRU 705 can send a request to mute all conference participants to the CMS 735 instead of directly to the mixer 730 that is hosting the conference. Either way may suffice, however, the host might execute this command via a web interface to the CMS 735, in which case the command would most likely go to the CMS 735 first. This way, the message flow is the same for either DTMF input or web input of the command once the message gets to CMS 735, if this consistency in message flow is important in a given application of the instant teachings.

Figure 5:
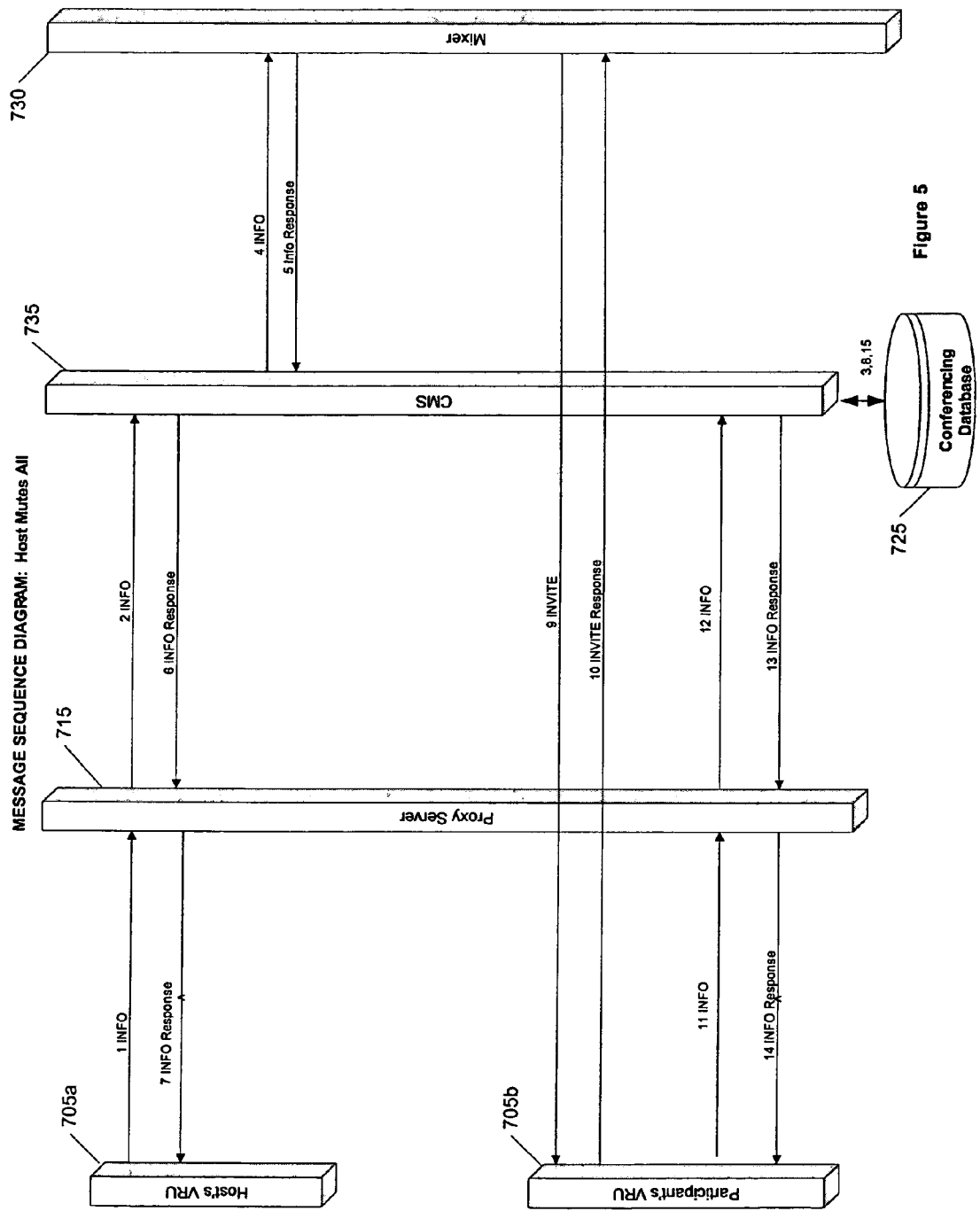
FIG. 5 is a diagram of an illustrative message sequence suitable for enabling a conference host to mute all conference participants.

Turning to FIG. 5:

1. The conference host (as opposed to a participant) enters DTMF signals indicating he/she wants to mute or un-mute all participants. The VRU 705a (assuming the host is coupled to this VRU) sends a SIP INFO request to the CMS 735 via the proxy server 715. The INFO request contains a special header (e.g., X-Command: Mute-Ali) and also contains the header x-conference-id to indicate the conference to which the mute command applies. Also, as usual, the INFO message has a Call-ID header that identifies the unit, line, and setup time of the sender, who is the conference host in this instance.

2. The INFO message from the previous step is forwarded to the CMS 735. Alternatively, if the host enters the command via the web interface to the CMS 735, the message flow may start at this point.

3. The CMS 735 checks the conferencing database 725 to see if the request is valid (e.g., does the conference exist, is the sender really the host?). Assuming this request is valid, the CMS 735 updates the conferencing database 725 to indicate that this conference is marked as muted or un-muted. The CMS 735 will send an INFO Response message back to the VRU to indicate that the (un)mute command succeeded in the following steps. If the request had been invalid, the INFO Response would indicate failure.

4. The CMS 735 sends an INFO message to the mixer 730 that is hosting the conference for which the Mute-All or Un-mute All command was issued. This INFO message contains the header x-Command: Mute-All (Or x-Command: Un-mute-All) along with the x-conference-id header.

5. The mixer 730 mutes or un-mutes all participants in the specified conference, and sends the INFO Response message back to the CMS 735. The INFO Response will have a 200 OK status code, and the other headers will be echoed from the request.

6. The CMS 735 sends the Info Response message back to the VRU 705a. Assuming that the request was valid, the response code will be 200 OK. This step can be skipped if the mute/un-mute command originated via the web interface to the CMS 735.

7. The Info Response message is forwarded by the proxy server 715 to the VRU 705a.

8. The CMS 735 updates the conferencing database 725 to indicate that the participants are muted or unmated in response to the host's command. Note that at this point the participants may not realize that they are muted—the VRUs 705a and/or 705b in the conference may still be sending RTP streams representing speech or voice originating with the participants. In the case of an un-mute command, the VRUs 705a and/or 705b may not yet be sending RTP streams. The following steps address this scenario.

9. The mixer 730 sends an INVITE message to the VRU (e.g., 705b, although some participants may be coupled to the VRU 705a, or to other VRUs 705) for each participant in the conference. The INVITE message contains updated an SDP in the entity body to indicate that the participant is to be muted or un-muted. Also, the Call-ID header will reflect the unit, line, and setup time of the participant to be muted or un-muted. Note that the VRU 705b may need to know who is being muted or un-muted, as that VRU 705b may be connected to many participants in this and other conferences.

10. The VRU 705b sends the INFO Response message to the mixer 730 to confirm the previous command.

11-14. The VRU 705b sends an INFO message to the CMS 735, via the proxy server 715, to inform the CMS 735 that it has muted or un-muted the appropriate ports to which the indicated participants are connected, as instructed. This INFO message can use the Call-ID header to specify the participant and the x-StatusUpdate: Muted header can indicate that the participant has been muted (i.e., the participant's VRU port has stopped sending RTP packets to the mixer 730), or x-west-StatusUpdate: Un-muted to indicate that the RTP stream has resumed in the case of an un-mute command.

15. The CMS 735 updates the conferencing database 725 to reflect the new state of the participants and/or the conference as a whole as being either muted or un-muted.

6. Host Mutes or Un-Mutes an Individual, Selected Participant

When the host wants to mute or un-mute an individual, selected participant, the participant can be specified by the order in which they joined the conference. The first person joining the conference can be designated '1', the second person designated '2', and so on. The host may or may not readily know the order in which conferees joined the conference, depending on the specific conferencing application. If audio announcements are enabled, the host may request and listen to the roll call to determine the order, because the mixer 730 can be configured to play the roll call in the order in which the participants joined, along with possibly a voice sample of the participant speaking his/her name when entering the conference. Also, the web interface to the CMS 735 can provide information to the host about the order, e.g., by displaying the ANI of each participant and the order in which they joined the conference. The ANI could be mapped to a corresponding name using one or more databases storing such information. Suitable databases may be available from vendors such as Targusinfo (www.targusinfo.com).

Referring back to FIG. 5:

1. The host enters DTMF signals indicating he/she wants to mute or un-mute participant number k, where k is an integer between 1 and the number of participants in the conference with the participant to be muted being identified via, e.g., a roll call of participants, as discussed above. The VRU 705a sends an SIP INFO request to the CMS 735 via the proxy server 715. The INFO request can contain a special header in the general form of x-Command: Mute k and also can contain the header x-conference-id to indicate the conference to which the command applies. Also, as usual, the INFO message can include a Call-ID header that identifies the unit, line, and setup time of the sender from whom the mute or un-mute command originates.

2. The INFO message from the previous step is forwarded to the CMS 735. Alternatively, if the host enters the command via the web interface to the CMS 735, the message flow would start at this point.

3. The CMS 735 checks the conferencing database 725 to see if the request is valid (e.g., does the conference exist, is the sender really the host, etc.). Assuming the request is valid, the CMS 735 updates the conferencing database 725 to indicate that participant k is marked as muted or un-muted. The CMS 735 then sends the INFO Response message back to the VRU 705a to indicate that the mute or un-mute command succeeded in the following steps. If the request had been invalid, the INFO Response would indicate failure.

4. The CMS 735 sends an INFO message to the mixer 730 that is hosting the conference for which the mute or un-mute command was issued. This INFO message can contain a header in the general form of x-Command: Mute or x-Command: Un-mute along with the x-conference-id header. Also the x-attendee-id header can be included to identify which conference participant is being muted or un-muted.

5. The mixer 730 mutes or un-mutes the specified participant and sends the INFO Response message back to the CMS 735. The INFO Response will have a 200 OK status code, along with the other headers echoed from the original request.

6. The CMS 735 sends the Info Response message back to the proxy server 715. Assuming the request was valid, the response code will be 200 OK. This step can be skipped if the command originated via the web interface.

7. The Info Response message is forwarded by the proxy server 715 to the VRU.

8. The CMS 735 updates the conferencing database 735 to indicate that the participant is muted or un-muted.

9. The mixer 730 sends an INVITE message to the VRU 705 through which the now muted or un-muted participant communicates with the conference. The INVITE message contains updated SDP data to indicate that the participant is now muted or unmated in response to the input command. Also the Call-ID header will reflect the unit, line, and setup time of the participant to be muted or un-muted.

10. The VRU 705b sends the INVITE Response message to the mixer 730 to confirm the previous command.

11-14. The VRU 705b sends an INFO message to the CMS 735, via the proxy server 715, to inform the CMS 735 that it has muted or un-muted itself. This INFO message can use the Call-ID header to specify the participant. The INFO message can use a header in the general form of the x-status-update: Muted to indicate that the participant has been muted (i.e., the VRU 705b has stopped sending any RTP packets containing voice that originated with the muted participant), or can use a header in the general form of x-status-update: Un-muted to indicate that the participant has been un-muted (i.e., the VRU 705b has resumed sending RTP packets containing voice that originated with the un-muted participant).

15. The CMS 735 updates the conferencing database 725 to reflect the new state (either muted or un-muted) of the participant.

7. Host Sets Entry/Exit Announcement State

At least four illustrative states for entry/exit announcements are discussed herein: off, tones only, name only, and both name and tones.

Figure 6:
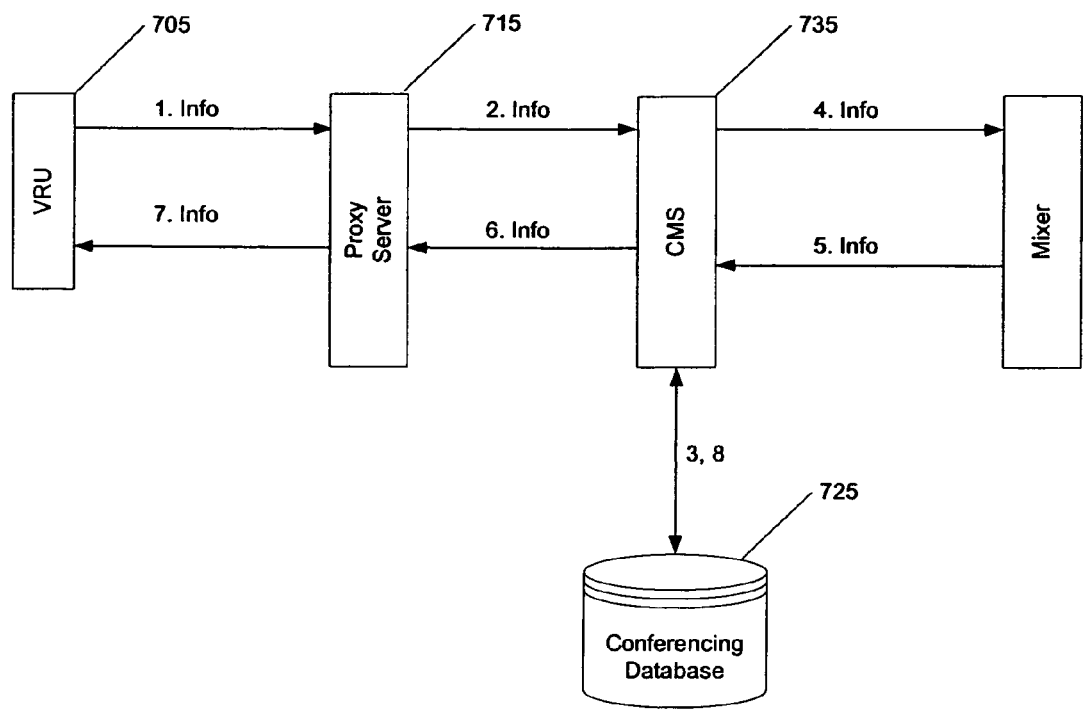
FIG. 6 is a block diagram of an illustrative message sequence suitable for specifying the announcement played to conferees upon entry to or exit from a conference call conducted according to the instant invention.

Turning to FIG. 6:

1. The host can enter predefined DTMF signals to set the entry exit state to tones only. The VRU 705 to which the host is coupled sends an INFO message to the CMS 735, via the proxy server 715. The INFO message can contain a header in the general form of x-command: SetEntryExit Tone. The message can also contain the x-conference-id header and the Call-ID header.

2. The proxy server 715 forwards the INFO message to the CMS 735.

3. The CMS 735 checks the conferencing database 725 to see if the request is valid (e.g. does the conference exist, is the sender really the host, etc.). Assuming the request is valid, the CMS 735 updates the conferencing database 725 to indicate the new entry/exit announcement status for the conference. The CMS 735 will send an INFO Response message back to the VRU 705 to indicate that the command succeeded in the following steps. If the request had been invalid, the INFO Response would indicate failure.

4. Assuming the entry/exit state is to be changed as requested, the CMS 735 sends an INFO message to the mixer 730 that is hosting the specified conference. This INFO message can contain a header in the general form of x-command: set-entry-exit Tone, and can also contain the x-conference-id header.

5. The mixer 730 changes the entry/exit announcement state internally, and sends an INFO Response back to the CMS 735 to indicate success.

6. The CMS 735 sends an INFO Response back to the VRU 705, via the proxy server 715.

7. The proxy server 715 forwards the INFO Response to the VRU 705.

8. The CMS 735 updates the conferencing database 725 to reflect the changes in entry/exit announcement state as necessary.

8. Host Locks/Unlocks Conference

The host can lock a conference, which means that no new participants can join the conference until the conference is unlocked. Since the CMS 735 brokers all requests to join the conference, it can handle the signaling related to the lock command, and the mixer 730 hosting the conference may not need to track or know if a conference is locked or unlocked.

Figure 7:
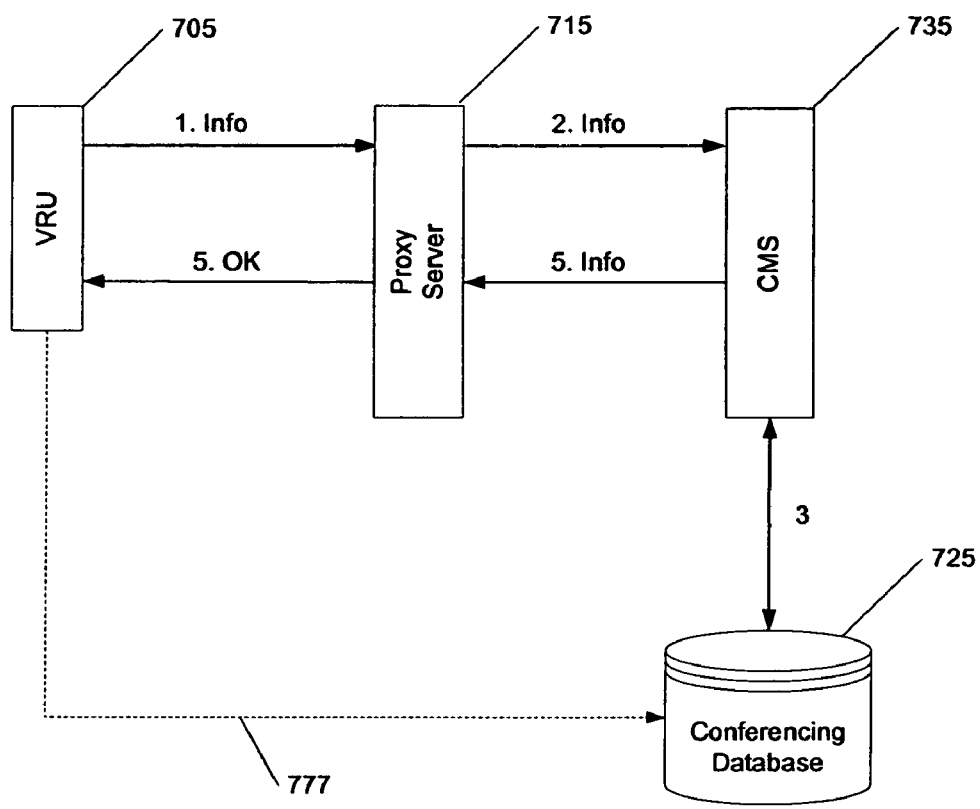
FIG. 7 is a diagram of an illustrative message sequence suitable for locking or unlocking a given conference call conducted according to the instant invention.

Turning to FIG. 7:

1. The host enters predefined DTMF signals to lock or unlock the conference. The VRU 705 to which the host is coupled sends an INFO message to the CMS 735 via the proxy server 715. The INFO message can contain a header in the general form of x-command: LockConference or x-command: UnlockConference, as the case may be. The INFO message can also contain the x-conference-id header and the Call-ID header.

2. The proxy server 715 forwards the INFO message to the CMS 735.

3. The CMS 735 checks the conferencing database 725 to validate the request to lock/unlock the conference (e.g., does the conference exist, is the sender really the conference host, etc).

4. The CMS 735 changes the state of the specified conference to locked or unlocked, depending on the command issued. If participants try to join a locked conference, they will be rejected, put on hold, notified with an appropriate message, or the like. Should additional participants request access to the locked conference, a VRU 705 coupled to such additional participant will send an INVITE or equivalent message to the CMS 735. The CMS 735 would see that the conference is locked, and would send an INVITE Response code of 480 (Temporarily not available), or another failure response code to the VRU 705.

In other embodiments of the invention, the lock/unlock functionality could be handled only by the VRU 705 by accessing the conferencing database 725 directly, essentially bypassing the CMS 735. This direct read or access of the conferencing database by the VRU 705 is represented by the dashed line 777 shown in FIG. 7. When a new potential participant calls in, the VRU 705 would determine whether the conference was locked by directly reading or accessing the conferencing database 725. In further embodiments of the invention, some combination of the two approaches could be taken: the VRU 705 could check the conferencing database 725, but if the VRU 705 does not check, the CMS 735 can still check to ensure that no new participants are added to a locked conference.

5. The CMS 735 sends an INFO Response back to the VRU 705 via the proxy server 715 indicating a success status such as 200 OK.

9. Host Deletes an individual participant

It is important to manage carefully the deletion of participants to ensure participants are not deleted accidentally or by mistake. One approach is to have the host delete a participant based on the participant's attendee ID. The CMS 735 assigns each participant in the conference a attendee ID that is unique at least within the conference (and perhaps globally unique as well) upon joining a given conference. The CMS 735 ensures that an assigned attendee ID is unique at least within a given conference. The host of the conference can determine the attendee ID of a conference participant by listening to a roll call or by using the web interface to the CMS 735. To facilitate quick roll calls, the CMS 735 preferably uses relatively truncated identifiers for the attendee ID, e.g., start counting at "1". These identifiers can take integer, character, or other form as recognized by those skilled in the art. When a participant is deleted or hangs up, the attendee ID is no longer used for that conference for any conferees joining the conference thereafter, thereby preventing subsequent confusion that could cause erroneous deletion of a participant.

1. The host enters predefined DTMF signals to request that a participant with an attendee-ID k, where k is an integer ranging from 1 to the number of participants in a given conference, be removed from the conference. The VRU sends an INFO Remove message to the CMS 735 via the proxy server 715 with a header in the general form of x-command: RemoveParticipant. Also included can be the x-conference-id header and the x-attendee-id header to specify the attendee ID of the participant to remove.

2. The proxy server 715 forwards the INFO message to the CMS 735.

3. The CMS 735 checks the conferencing database 725 to validate the request. (e.g., conference exists, sender is host, etc.).

4. The CMS 735 sends an INFO message to the mixer 730, echoing the INFO Remove command sent from the VRU 705 in step 1 above.

5. The mixer 730 sends an INFO Response message back to the CMS 735. The mixer 730 then removes the participant specified in the command from the conference, for example, by disabling or terminating the link between the (either physical or logical) mixer 730 and the VRU 705 over which the deleted participant formerly communicates.

6. The CMS 735 sends INFO response back to the VRU 705 via the proxy server 715.

7. The mixer 730 sends a BYE message directly to the VRU 705 to which the deleted participant is coupled (which may or may not be the same VRU 705 to which the conference host is coupled) to inform the deleted participant that he/she has been deleted.

8. The VRU 705 responds to the BYE message and sends the same to the mixer 730.

9. The VRU 705 sends an INFO message to the CMS 735 (via the proxy server 715). The message contains a header in the general form of x-status-update: LeftConference, along with the Call-ID field to indicate the participant to whom the message refers.

10. The conferencing database 725 is updated to indicate that the conference no longer includes the deleted participant.

10. Host Sets Host-Hang-Up Behavior

The behavior of the conferencing application when the host hangs up can take one of at least two states, which are selectable by the host. The conference can terminate when the host hangs up, or it can continue until all participants have hung up (or all except 1). The x-command header can be used in connection with this command. An illustrative embodiment of this command can take the general form of x-command: SetTerminateOnHostHangup [True|False]. An illustrative sequence of messages to implement this command can include at least the following:

1. The host enters predefined DTMF signals to set the conference behavior to terminate when the host hangs up. The VRU 705 to which the host is coupled sends an INFO message to the CMS 735 via the proxy server 715. The INFO message can contain a header in the general form of x-Command: SetTerminateOnHostHangup True, and also a header in the form of x-conference-id.

2. The proxy server 715 forwards the above INFO message to the CMS 735.

3. The CMS 735 checks the conferencing database 725 to validate the request, illustrative examples of which are discussed above. If the request is valid, the CMS 735 updates the conferencing database 725 to reflect the new host-hangup behavior.

11. Host Requests Roll-Call

The host can request, either by DTMF input or through the web interface, that an audio roll call be played for the host. The roll call can involve playing the audio clips that each participant recorded when he/she joined the conference (including the host's own clip). The attendee-ID will be read before each clip is played. The reading of the attendee-ID is optional—it can be turned off by setting the "x-roll-call-type" header when the conference is created. The default can be set to "standard", which means the attendee-IDs will be played during the roll call. An alternative is "NoParticipantID", which will suppress the playing of the attendee-ID. If at any time during the playback of a roll call the host wants to stop the roll call, an INFO message can be sent with a command to stop the roll call. This command may receive an input parameter in the general form of an "x-conference-id".

1. The host enters DTMF signals that represent a request for a roll call. The VRU 705 sends an INFO message to the CMS 735, via the proxy server 715, with a header in the general form of x-Command: PlayRollCall and a header in the form of x-conference-id.

2. The proxy server 715 forwards the INFO message to the CMS 735.

3. The CMS 735 checks the conferencing database 725 to validate the request, as discussed above. In this case, assume the request is valid (e.g., the sender is the host, the conference exists, etc.).

4. The CMS 735 sends the INFO message to the mixer 730 hosting the conference, echoing the headers from the INFO message it received from the VRU 705.

5. The mixer 730 sends an INFO Response message to the CMS 735. The mixer 730 then plays the roll call on the RTP stream directed to the host.

In an alternative embodiment, the request for the roll call does not go through the CMS 735. This request could go from the VRU 705 directly to the mixer 730. Since the request for the roll call does not change the state of the conference, the CMS 735 need not necessarily process or otherwise be involved with this request. However, since the host might make the request through the web interface, which may go through the CMS 735, different embodiments of the instant invention can either include or exclude the CMS 735 in processing this request. Also, including the CMS 735 in the message sequence may enable the CMS 735 to track how many times the roll call feature is used.

6. The CMS 735 sends an INFO Response message to the VRU 705 via the proxy server 715 indicating a status of 200 OK.

12. Host Requests Participant Count

The message sequence for requesting a count of participants can be identical to the one above for requesting a roll call. One difference, in some embodiments of the instant invention, is that the mixer 730 can play for the host a sound clip that speaks the number of participants instead of playing a roll call. A suitable command to realize this function could be in the general form of "x-command: PlayParticipantCount".

In other embodiments of the instant invention, command could be executed on the VRU 705 without involving the CMS 735 or the mixer 730. In these embodiments, an application running on the VRU 705 can access the conferencing database 725 directly, retrieve the data representing the participant count, and provide the participant count to the host, e.g., verbally.

13. Host Requests that Conference be Recorded

The voice stream or various voice streams comprising the conference could be recorded by an application running on the VRU 705 coupled to the host or on the mixer 730 hosting the conference. If an application running the mixer 730 records the conference, the message flow related to the record conference can be based on the flow for the roll call request. A suitable command may take general form of "x-command: RecordConference".

14. The CMS 735 Ends Conference

In some circumstances, the CMS 735 may unilaterally end an ongoing conference, for any one of several reasons. In the context of a pre-paid conferencing plan, an ongoing conference may be terminated if the conference exhausts all of the host's existing, stored pre-paid value. In other cases, all participants but one may have hung up, or the host may have hung up and the conference is configured to end when the host hangs up.

In any event, the message flow when the CMS 735 ends a conference is discussed above in connection with Section 4. The CMS 735 can use a command header in the general form of "x-Command: TerminateConference" to command the mixer 730 to end a particular conference. The INFO message may also contain the x-conference-id header.

15. Participant Drops Unexpectedly

The mixer 730 can detect if the RTP stream from a participant disappears. Sometimes this may be normal. For example, the participant could be in listen-only mode, or even if the participant was not explicitly placed in listen-only mode, he may have muted himself. In this case, the VRU 705 (or SIP phone, etc.) may stop sending RTP packets to save bandwidth. Therefore, it may not be necessary to take action when these circumstances occur.

16. Mixer Crashes

If the mixer 730 hosting a given conference "crashes", an application on the VRU 705 can detect the loss of the RTP stream from the mixer 730, and thus can detect failure of the mixer 730. Likewise, the CMS 735 and/or the proxy server 715 can detect the loss of a mixer 730 by monitoring the heartbeat messages from the mixer 730. The CMS 735 can handle mixer failure by e.g., requesting the proxy server 715 to create a new conference on another "live" mixer 730, and updating the conferencing database 725 and the VRU 705 state tables accordingly to reflect that the conference is now hosted on the second mixer 730.

17. Mixer Heartbeat Monitoring

The software running on a given mixer 730 can send a heartbeat message to the CMS 735 after expiration of a predefined interval. The interval at which the message can be specified as a configurable parameter related to the mixer 730. Even though the CMS 735 may not itself load balance among the mixers 730 (this can be done instead by the proxy server 715), it may be useful for the CMS 735 to maintain at least some information about the state of the mixers 730 at its disposal. Maintaining this information in, e.g., a database 725 can allow for some degree of system-wide monitoring from the conferencing database 725.

The heartbeat message can be sent as a SIP INFO message from each mixer 730, through the proxy server 715, to the CMS 735. This message can contain a header in the following general form of x-heartbeat: PercentIdle.

Receiving and processing this heartbeat message will allow the CMS 735 to store, e.g., in the conferencing database 725, current information about which mixers 730 are operative and what their CPU load is. This type of information also enables the proxy server 715 to load balance among various mixers 730, and to select a given mixer 730 to host a new conference. Other information can be added to the heartbeat messages as desired.

In other embodiments, the CMS 735 (or other software) can send an INFO message to the mixer 730 instructing it to adjust its heartbeat interval or frequency. This INFO message can contain a header in the following general form of x-command: SetHeartbeatPeriod n.

where n is the number of seconds between heartbeat messages.

18. Registration Procedures

This section describes an illustrative strategy suitable for registering interface servers 720 and mixers 730 with the SIP proxy servers 715. Each mixer 730 can register with the proxy servers 715 based on entries in the configuration file corresponding to the mixer(s) 730. The configuration file will preferably contain an entry for each proxy server 715 with which a mixer 730 is to register. In illustrative embodiments of the invention, a given mixer 730 will register once with each proxy server 715 at the mixer's local site.

In these illustrative embodiments, interface servers 720 need only register once with each proxy server 715 at the local site. In alternative embodiments of the invention, interface servers 720 may or may not register with remote proxy servers 715.

If all mixers 730 at a given site are near capacity, and have thus unregistered themselves with the local proxy servers 715, the CMS 735 may need to create new conferences at other sites, if requests for new conferences so demand. For example, the CMS 735 can be configured to "know" about a proxy server 715 located at a remote site. Were there no mixers 730 of a given class registered with the local proxy server 715, the CMS 735 could send an INFO message to a remote proxy server 715 to try to establish a new conference at that remote site. This processing would preferably be transparent to the VRU 705 requesting the new conference. If this new conference is successfully created at the remote site, the VRU 705 would receive the 302 redirect response with a suitable header indicating that a remote mixer 730 will be hosting the new conference, and that the VRU 705 should contact that remote mixer 730 to establish a link therebetween.

19. Outdial

Other aspects of the instant invention can include outdialing from a given conference to a third party.

1. A conferencing application can collect DTMF input from the host indicating that the host needs to initiate an outdial. The conferencing application then seizes a SIP session that can be used in an IP call between the host and the outdialed party. The application assigns an instance string to this SIP session.

2. The conferencing application queues the outdial request into an outdial database 706. Information in the outdial request can include at least:
   Number to dial
   Unit
   Line
   setup time
   SIP instance 3. The outdial VRU 705c pulls the request from the outdial database 706. Before the outdial VRU 705c dials the destination number, it must first establish the IP connection with the host VRU 705a. The outdial application seizes an IP line and a SIP session and instructs the SIPd to send the INVITE request to the host VRU 705a.

4. The SIPd on the outdial VRU 705c sends INVITE to the inbound (host) VRU 705a to establish an IP-based communication therebetween. SIPd is a high performance, scalable SIP proxy and location server, written in, e.g., the C programming language. The SIP URL to which this request is sent is constructed from parameters stored in the outdial database 706.

5. The SIPd on the host VRU 705a receives the INVITE message, and based on the parameters therein it determines a destination 780 to which to send a message. SIPd sends an message transfer layer (MTL) message to this destination to inform an application that it should open the IP connection between the host VRU 705a and the outdial VRU 705c. The transport information that was received in the INVITE message is included in the MTL message, along with an SIP instance parameter.

6. The application sends a generic MTL message to the IP daemon to seize an IP channel. As part of this process, the application determines the local transport parameters for the RTP stream.

7. The application sends a generic MTL message to SIPd with the parameters (the local transport parameters) that should be used to send the 200 OK message to the sip daemon on the outdial VRU.

8. SIPd sends the 200 OK message to the outdial VRU. Outdial VRU SIPd receives the 200 OK and sends an MTL message to inform the outdial app that it should open the IP connection.

9. Outdial VRU opens the RTP stream and sends the ACK back to the host VRU. The application on the host VRU opens the RTP channel and routes the audio so the caller (host?) is now listening to the audio from the RTP stream.

10. After sending the ACK message to the host VRU, the outdial VRU routes the audio and dials the outbound number. The IP call between the host and the dialed party is established.

11. The host enters DTMF indicating he wants to bring the called party into the conference. Application makes library call, which sends a generic message to SIPd telling it to send an INFO message to the outdial VRU. The INFO message contains special x-headers. An illustrative format for this information can include the following:
   x-command: JoinConference
   x-participant-code: 12345 (the participant code that the outdial VRU must include in its message can take the following form: INVITE message to the CMS 735)

12. The SIPd on the outdial VRU gets this INFO message and passes it to the application in an MTL message. The application on the outdial VRU can adopt any of the following embodiments. In one embodiment, it can prompt the dialed party to ask whether he or she wants to join the conference. If the dialed party decides that it wants to join the conference, that party—or a VRU application interacting with that party—can use a variant of the above message flow to enable the called party to join the conference. This variant of the above message flow can be identical to how any caller joins the conference, except instead of prompting the dialed party for a conference code or participant code, this variant uses the participant code that is passed as a parameter in the illustrative INFO message given above. This results in an INVITE message being sent to the CMS 735, and the outdialed party can joins the conference similarly to any other caller 700, more particularly a participant. Preferably, the application on the outdial VRU record a name clip for the outdialed party.

13. The IP session between the two VRU is cleaned up. The host VRU sends a BYE to the outdial VRU, and both sides release the IP and SIP sessions. The host VRU then routes the audio back to the conference IP session.

14. The host enters DTMF signals indicating he wants to rejoin the conference but NOT invite the outdialed party in with him. The outdial application calls a library function to end this SIP session. The Library can then send a generic message to the SIPd to send the BYE message and release the SIP session.

Illustrative SIP Header Extension Fields

This section summarizes the various headers used in various embodiments of the invention. These headers are referenced above in the discussion of the above illustrative message flows. INFO messages can contain an appropriate command header to indicate the purpose of the INFO message. Table 2 lists various illustrative but non-limiting command values. Following table 2, the headers are defined in table 3. Some headers can be used in commands (i.e. INFO messages) or used in the INVITE command.

Table 2 contains descriptions of the various commands referenced herein.

TABLE 2 x-command Descriptions

| x-command value | Description | Related headers |
|---|---|---|
| TerminateConference | Sent from CMS 735 to Mixer 730 to end a conference. | x-conference-id x-terminate-reason |
| MuteAll | Sent from VRU 705 to CMS 735 and CMS 735 to Mixer 730. Causes all conference participant talk privileges to be turned off. Can be followed by the Un-mute command for selected participants. | x-conference-id |
| Un-muteAll | Sent from VRU 705 to CMS 735 and CMS 735 to Mixer 730. Causes all conference participant talk privileges to be turned on. | x-conference-id |
| Mute | Sent from VRU 705 to CMS 735 and CMS 735 to Mixer 730. Causes a specific participant's talk privileges to be turned off. | x-conference-id x-attendee-id |
| Un-mute | Sent from VRU 705 to CMS 735 and CMS 735 to Mixer 730. Causes a specific participant's talk privileges be turned on. | x-conference-id x-attendee-id |
| SetEntry | Sent from VRU 705 to CMS 735 and CMS 735 to Mixer 730. Specifies the desired state of entry name/tones. Can be used to change parameters from how they were set at conference creation. | x-conference-id x-entry |
| SetExit | Sent from VRU 705 to CMS 735 and CMS 735 to Mixer 730. Specifies the desired state of exit name/tones. Can be used to change parameters from how they were set at conference creation. | x-conference-id x-exit |
| LockConference | Sent from VRU 705 to CMS 735. No new participants can be added to the conference once it is locked. | x-conference-id |
| UnlockConference | Sent from VRU 705 to CMS 735. | x-conference-id |
| RemoveParticipant | Sent from VRU 705 to CMS 735 and CMS 735 to Mixer 730. Causes the mixer 730 to hang up on the specified participant. | x-conference-id x-attendee-id |
| SetWrapTime | Sent from VRU 705 to CMS 735. This command is used to update the value from how it was set upon conference creation. | x-conference-id x-seconds |
| SetRollCallType | Sent from VRU 705 to CMS 735 and CMS 735 to Mixer 730. Specifies whether or not an attendee ID is read preceding each name in a roll call. By default, attendee IDs are read. | x-conference-id x-roll-call-type |
| PlayRollCall | Sent from VRU 705 to CMS 735 and CMS 735 to Mixer 730. Causes mixer 730 to play the roll call to the host. | x-conference-id |
| StopRollCall | Sent from VRU 705 to CMS 735 and CMS 735 to Mixer 730. Stops playing roll call (interrupts it). | x-conference-id |
| PlayParticipantCount | Sent from VRU 705 to CMS 735 and CMS 735 to Mixer 730. Causes mixer 730 to announce the current participant count to the host. | x-conference-id |

TABLE 2-continued x-command Descriptions

| x-command value | Description | Related headers |
| --- | --- | --- |
| StartRecording | Sent from VRU 705 to CMS 735 and CMS 735 to Mixer 730. Causes the mixer 730 to immediately begin recording the current conference. | x-conference-id |
| StopRecording | Sent from VRU 705 to CMS 735 and CMS 735 to Mixer 730. Causes the mixer 730 to immediately stop recording the current conference. | x-conference-id |
| SetHeartbeatPeriod | Sent from an administrative tool to Mixer 730 or from CMS 735 to Mixer 730. Changes the number of seconds between heartbeat messages. | x-seconds |
| CreateNewConference | Sent from CMS 735 to Mixer 730 to create a new conference with the specified configuration. | x-conference-id<br>x-on-hold-music-url<br>x-periodic-message-url<br>x-upsell-message-url<br>x-entry<br>x-exit<br>x-lecture-only-flag<br>x-record-flag<br>x-roll-call-type<br>x-max-hold-time<br>x-max-wrap-time |
| WrapWarning | Sent from CMS 735 to Mixer 730. Causes the mixer 730 to play a warning message to the conference warning that the conference will end in the specified number of seconds because the host has left. | x-conference-id<br>x-seconds |
| HoldWarning | Sent from CMS 735 to Mixer 730. Causes the mixer 730 to play a warning message to the conference warning that the conference will end in the specified number of seconds unless the host arrives. | x-conference-id<br>x-seconds |
| StatusUpdate | Sent from VRU 705 to CMS 735 or Mixer 730 to CMS 735. Informs CMS 735 of a change that occurred. CMS 735 may already "know" about the change, this message is a confirmation. | x-conference-id<br>x-attendee-id<br>x-status-change |
| Heartbeat | Sent from Mixer 730 to CMS 735. Informs CMS 735 of the current mixer CPU load. | x-cpu-idle |

Table 3 contains a description of various header fields referenced herein, such as in Table 2 above.

TABLE 3 x headers used

| Header | Description/Value |
| --- | --- |
| x-host-code | The host code. Sent in INVITE message from VRU when conference host calls in. |
| x-mixer-group | Sent from VRU to CMS in the INVITE message. Instructs CMS about which mixer classes to try to create the conference on, in order of priority. |
| x-terminate-reason | The reason why a conference is being terminated. Sent from CMS to the mixer in the x-command: TerminateConference message. Value is one of: Hold, Wrap, Normal. |
| x-participant-code | The participant code. Sent in INVITE message from VRU when conference participant calls in. |
| x-nameclip-url | Sent from VRU to the mixer in the INVITE message. |
| x-client | The client name. Sent in INVITE message from VRU. |
| x-mixer-group | A pipe-delimited string listing mixer classes that orchestra will try, in the order it would try them. Sent in INVITE message from VRU. |

TABLE 3-continued x headers used

| Header | Description/Value |
| --- | --- |
| x-site | The VRU site name (e.g. Denver, Atlanta). Sent in INVITE message from VRU. |
| x-email-notify | Y or N. Sent in INVITE message from VRU. |
| x-email-address | Email address to use for conference notification. Sent in INVITE message from VRU. |
| x-phone | The ANI of the caller (who called into the VRU). Sent in INVITE message from VRU. |
| x-app-tag | Passed from VRU to CMS in the INVITE message to identify the application. |
| x-dialed-number | Passed from VRU to CMS in the INVITE message to identify the number dialed by the caller. |
| x-max-duration | Used for pre-paid conferencing, to specify how long conference is permitted to proceed. |
| x-end-prompt-time | Used for pre-paid conferencing to specify a time at which a prompt related to the expiration of a conference will be issued. |
| x-attendee-id | A string of digits or integer that identifies a conference participant uniquely within a given conference. Assigned by CMS and included in the INVITE message sent from the VRU to the mixer. Preferably unique per conference. This number will be read preceding each name clip for a roll call. The header is also sent in various INFO messages, because it is used to reference a participant for an action. (mute/un-mute, delete, etc.) |
| x-conference-id | A globally unique string made up by CMS to identify a conference. Sent in the INVITE message from VRU to Mixer, as well as in most command (INFO) messages. |
| x-participant-type | Host, Participant, Lhost, Lparticipant (L for lecturer, applies only to lecture only conference). Sent in the INVITE Message from the VRU. |
| x-seconds | Used with various commands to specify a time value. |
| x-status-change | Used with the StatusUpdate command. Will be one of: JoinedConference LeftConference Muted Un-muted |
| x-on-hold-music-url | A URL of a file to use for the music track. Use the string "standard" to specify standard music. Use "none" to create a conference with no on hold music. If the header is not present, the default (standard) music will be used. Sent along with the CreateNewConference command. Also sent in INVITE messages from VRU. |
| x-periodic-message-url | A URL of a file to use for the periodic on-hold message. Use the string "standard" to play a standard message. Use the string "none" to specify that no periodic message be played. Will default to standard periodic message if header not present. Sent along with the CreateNewConference command. Also sent in INVITE messages from VRU. |
| x-roll-call-type | Specifies whether or not roll calls will contain the attendee id clips. Default is to play the attendee id clips. To turn them off, use "NoAttendeeID". To explicitly turn them on, use "Standard". Sent along with the CreateNewConference command and also in the SetRollCallType command. Also sent in INVITE message from VRU. |
| x-upsell-message-url | A URL of a file to play once to a participant while holding. Will default to no upsell message if header is not present. Sent along with the CreateNewConference command. Also sent in INVITE messages from VRU. |
| x-entry | One of: None, Name, Tone, NameAndTone. Will default to Tone if header not present. Sent along with the CreateNewConference command. Also sent with the SetEntry command. And INVITE messages from VRU. |
| x-exit | One of: None, Name, Tone, NameAndTone. Will default to Tone if header is not present. Sent along with the CreateNewConference command. Also sent with the SetExit command and INVITE messages from the VRU. |
| x-lecture-only-flag | Y or N. Will default to N if header is not present. Sent in CreateNewConference command and INVITE messages from VRU. |
| x-record-flag | Y or N. Will default to N if header is not present. Sent in CreateNewConference command and INVITE messages from VRU. |
| x-max-hold-time | Max # of seconds to allow participants to hold for a conference while waiting for the host to arrive. Value 0 means can't hold at all, host must join first. Will default to 600 seconds if header is not present. Sent in CreateNewConference command and INVITE messages from VRU. |

TABLE 3-continued x headers used

| Header | Description/Value |
|---|---|
| x-max-wrap-time | Max # of seconds to allow participants to continue on conference after host leaves. Value of 0 indicates conference terminates immediately when host leaves. Will default to 1200 seconds if header is not present. Sent in CreateNewConference command and INVITE messages from VRU. |
| x-cpu-idle | Sent in the Heartbeat command from the Mixer to CMS. |

Registration & Load Balancing

The invention provides alternative embodiments described below for performing registrations and load balancing for various SIP devices.

Case 1: No use of layer 3 ("L3") switching

| WHO | WHAT | With Which Proxy Servers 715 to Register: |
|---|---|---|
| VRU 705 | sip:sipd@eosxx.url | Local proxy servers 715 only. |
| CMS 735 | sip:orchestra@siteyy.url | Local proxy servers 715 only by default. Remote proxy servers 715 when needed to create conference on remote mixer because local mixers are unavailable for new conference. |
| Mixer 730 | sip:mixerA@wic.url sip:mixerB@wic.url | Local proxy servers 715 only. |

1. The VRU 705 can be configured to register with the local proxy servers 715 only. The VRU 705 registers with a proxy server 715 so that it will receive OPTIONS messages from the proxy servers 715. The VRU 705 can respond to these options messages using the X-Load header so that the proxy server 715 keeps sending them. The VRU 705 will keep a list of proxy servers 715 that are active and round robin amongst them for each transaction or session, assuring that retransmissions for any message go to the same proxy server 715. When the VRU 705 stops getting OPTIONS messages from any proxy server 715, it assumes that the proxy server 715 is down. The VRU 705 may then attempt to re-register with that proxy server 715 periodically until the proxy server 715 comes back up.

2. On start-up or boot-up, the CMS 735 can register only with local proxy servers 715. The CMS 735 can provide its site code as part of the name under which it registers. This means whenever the VRU 705 or a mixer 730 sends a message to the CMS 735, they must send it to the "local" CMS 735 by using the local sitecode in the message. When the CMS 735 needs to create a new conference, it first tries sip:mixerA@url. If that fails (no 200 OK response to the CreateNewConference INFO message) then the CMS 735 tries again using sip:mixerB@url. If that fails too, then the CMS 735 will register with remote proxy servers 715. The CMS 735 will then repeat the foregoing process with the remote proxy servers 715, thus, the CMS 735 will attempt to register with sip:mixerA@url at a remote site, followed by mixerB@url. The CMS 735 will handle the OPTIONS messages sent by the proxy server 715 exactly as outlined above for the VRU 705 (failure detection, re-registration).

3. The mixer 730 need only register with local proxy servers 715. The mixer 730 will respond to the OPTIONS messages using the X-Load header to report its load to the proxy server 715. The following formula can be used to determine the mixer's load:

Cavg=Average number of participants expected in a conference. Can be set to e.g., 6.

numconf=number of (non empty) conferences existing on the mixer 730 at a given time.

numparties=number of participants in a conference at a given time.

M=Maxcalls=absolute maximum number of actual calls that a mixer 730 will accept—can be set to e.g., 240.

P=Projected Calls=Cavg*num_conf+SUM over all conferences of (numparties—Cavg)

T=Threshold for new conference acceptance=percentage of maxcalls that will be allowed. Can be set to, e.g., 75%, which corresponds to 180 PROJECTED calls.

L=Load that will be reported to proxies=P/M

When deciding whether or not to accept a new conference the mixer 730 can use the following function: if (L<T) then accept else reject. If the mixer 730 is configured to unregister with the proxy server 715 when L≧1, then the fact that the mixer 730 remains registered with the proxy server 715 at a given time inherently suggests that the mixer 715 is not overloaded at that time. This calculation is implicit because the mixer 730 unregisters when L >=T)

Case 2: Using L3 Switching

Alternatively, the invention can use L3 switching as a front end for the proxy server(s) 715, and the switches performing the L3 switching will inherently be aware that requests from a given client always use the same proxy server 715. If this is the case:

| WHO | WHAT | WHERE |
|---|---|---|
| VRU 705 | NO REGISTRATION NEEDED | N/A |
| CMS 735 | sip:orchestra@url | Local proxy server 715 only. |
| Mixer 730 | sip:mixerA@url sip:mixerB@url | Local proxy server 715 only. |

1. The VRU 705 need not to register with any proxy server 715. In this embodiment, the VRU 705 is configured to use the L3 switch as the proxy IP address, and the intelligence to perform the functions that would otherwise require the VRU 705 to register with the proxy server 715 becomes intrinsic to the switch.

2. On boot, the CMS 735 need not register only with local proxy servers 715. The CMS 735 need not use its site code as part of the registration name, because it can access remote proxy servers 715 without registering with them. It need only be configured with the IP address of the remote proxy server 715 (L3 switch). When the CMS 735 needs to create a new conference, it first tries sip:mixerA@url. If that fails (no 200 OK response to the CreateNewConference INFO message) then the CMS 735 tries again using sip:mixerB@url. If that fails too, then the CMS 735 will try again with mixerA using the remote proxy address. The CMS 735 will handle the OPTIONS messages sent by the proxy server 715 by responding with the Load header.

3. The mixer 730 will register only with the local proxy servers 715. The mixer 730 will respond to the OPTIONS messages from the proxy server 715 using the Load header to report its load to the proxy server 715. The following formula is used to determine the load of a mixer 730:

Cavg=Average number of participants expected in a conference, can be set to e.g., 6.

numconf=number of (non empty) conferences existing on the mixer 730 at a given time.

numparties=number of participants in a conference at a given time.

M=Maxcalls=absolute maximum number of actual calls that mixer 730 will accept—can be set to e.g., 240.

P=Projected Calls=Cavg*num_conf+SUM over all conferences of (numparties—Cavg)

T=Threshold for new conference acceptance=percentage of maxcalls that will be allowed. Will be set to e.g., 75%, which corresponds to 180 PROJECTED calls.

L=Load that will be reported to proxies=P/M

When deciding whether or not to accept a new conference the mixer 730 can use the following function: if (L<T) accept else reject.

1.1 Mixer Classes

As shown above, the mixer 730 will register using a SIP url of the form sip:<mixer-class>@url. The invention can include defining different classes of mixers 730, with each class having specific performance parameters or characteristics associated with mixers 730 registered under that class. The class under which a given mixer 730 is to register is specified in the mixer configuration file.

For example only, an illustrative configuration can have 4 mixers 730 register as, e.g., a type "A" mixer 730 and 1 mixer 730 register as, e.g., a type "B" mixer 730. Further, the invention can include providing one or more special mixer classes defined for specific clients that can only be used by that client. The VRU 705 can use a database lookup to access a list of mixers 730 in the appropriate class that the CMS 735 should use to create the conference. The CMS 735 will first try the first element in the list. If it fails it will try the $2^{nd}$ element, then $3^{rd}$, etc. The VRU 705 will first use the host code to look up a "Level of Service" parameter applicable to that host. This level of service is used to look in another database table to look up the mixer 730 class string. The mixer 730 class string will then be used by the VRU 705 in an additional header in the INVITE message sent to the CMS 735. The header can be in the form of x-mixer-group, and the format can be a pipe-delimited list of mixer classes, e.g., x-mixer-group: A|B|C|Sams.

One or more suitable application programs can implement software residing on a computer-readable medium or media and embodying the various aspects of the method discussed herein and shown in the drawing figures. This software can be coded using any suitable programming or scripting language. However, it is to be understood that the invention as described herein is not dependent on any particular operating system, environment, or programming language. Illustrative operating systems include without limitation LINUX, UNIX, or any of the Windows™-family of operating systems, and illustrative languages include without limitation a variety of structured and object-oriented languages such as C, C++, Visual Basic, or the like. Further, various aspects of the teaching herein may be implemented in hardware or firmware, instead of or in conjunction with the software embodiments discussed above.

As those skilled in the art will understand, the program of instructions can be loaded and stored onto a program storage medium or device (not explicitly shown) readable by a computer or other machine, embodying a program of instructions executable by the machine to perform the various aspects of the invention as discussed and claimed herein, and as illustrated in the drawing figures. Generally speaking, the program storage medium can be implemented using any technology based upon materials having specific magnetic, optical, semiconductor or other properties that render them suitable for storing computer-readable data, whether such technology involves either volatile or non-volatile storage media. Specific examples of such media can include, but are not limited to, magnetic hard or floppy disks drives, optical drives or CD-ROMs, and any memory technology based on semiconductors or other materials, whether implemented as read-only, flash, or random access memory. In short, this embodiment of the invention may reside either on a medium directly addressable by the computer's processor (main memory, however implemented) or on a medium indirectly accessible to the processor (secondary storage media such as hard disk drives, tape drives, CD-ROM drives, floppy drives, or the like). Consistent with the above teaching, program storage device 30 can be affixed permanently or removably to a bay, socket, connector, or other hardware provided by the cabinet, motherboard, or other component of a given computer system.

Those skilled in the art will also understand that a computer programmed in accordance with the above teaching using known programming languages provides suitable means for realizing the various functions, methods, and processes as described and claimed herein and as illustrated in the drawing figure attached hereto.

Those skilled in the art, when reading this description, will understand that unless expressly stated to the contrary, the use of the singular or the plural number herein is illustrative, rather than limiting, of the instant invention. Accordingly, where a given term is discussed in the singular number, it will be well understood that the invention also contemplates a plural number of the item corresponding to the given term and vice versa, unless expressly stated herein to the contrary.

Those skilled in the art will further recognize that for the purposes of convenience, legibility, and clarity, the drawings illustrate various data stores 710 and 725 separately, and they are discussed separately herein. However, the embodiments shown herein are illustrative rather than limiting, and some or all of these various data stores could readily be combined or consolidated into one or more data stores, or could be further subdivided into smaller data stores, without departing from the scope of the invention.

The term "data store" herein refers to any storage medium capable of storing data, whether realized using semiconductor, magnetic, or optical technology. This term can also include abstract data structures supported by any number of programming languages, with non-limiting examples including queues, stacks, linked lists or the like, all of which are implemented at the machine level by disk storage, semiconductor memory, optical media, or the like. If the data store is implemented as a database, this database can take the form of a relational database, an object-oriented database, and any combination thereof, or any other known database technology. Suitable database server programs are readily available from a variety of vendors, including IBM/Informix, Microsoft, Oracle, or the like.

Various embodiments of the invention are described above to facilitate a thorough understanding of various aspects of the invention. However, these embodiments are to be understood as illustrative rather than limiting in nature, and those skilled in the art will recognize that various modifications or extensions of these embodiments will fall within the scope of the invention, which is defined by the appended claims.

We claim:

1. A method of entering a host into a new conference call, the method comprising at least the following:
    receiving a call and receiving at least a conference code from a given caller at a VRU;
    forwarding the conference code to a proxy server via a provisioning database, wherein the provisioning database responds to the VRU with a signal indicating a validity or an invalidity of the conference code submitted by the VRU to the provisioning database;
    sending a request to the proxy server to enter the given caller into a conference call and determining, by the proxy server, that the request from the VRU relates to conferencing services;
    maintaining a list, by the proxy server, of each of a plurality of interface servers, wherein each of the plurality of interface servers function at least in part to support the queues that contain requests to be acted upon by a conferencing request, the proxy server further maintaining running counts of message requests pending or awaiting on each of the plurality of interface servers and performing load balancing across each of the plurality of interface servers;
    forwarding, by the proxy server, the request to a conference management system, which comprises at least a data store and at least a plurality of interface servers receiving the request;
    determining that the given caller is a conference host;
    determining that at least one participant has called in previously to the given caller and has provided a conference code that is at least related to the conference code entered by the given caller;
    requesting that a new conference be created that corresponds to the conference code entered by the given caller;
    assigning the new conference to one of a plurality of mixers, wherein the conference management system requests that the proxy server select one of the plurality of mixers to host the new conference call, which will be associated with a unique identifier generated for the new conference;
    corresponding a unique mixer identifier to the selected mixer stored with the conference code and the conference identifier thereby associating the conference with the mixer;
    providing the unique identifier to the one mixer and the VRU, wherein the mixer identifier uniquely identifies the one mixer to the VRU;
    loading the data store with at least the conference code, the unique identifier for the new conference, and the mixer identifier; and
    placing the VRU and the one mixer in audio communication.

2. The method of claim 1, further comprising determining a class of mixer associated with the conference code.

3. The method of claim 1, further comprising selecting a class of mixer to host the new conference based on the conference code.

4. The method of claim 1, wherein assigning the new conference includes assigning the new conference to a mixer of a class associated with the conference code.

5. The method of claim 1, further comprising receiving at least a second call from a second caller seeking entry to the new conference call, wherein the at least second call is received at a further VRU.

6. The method of claim 1, further comprising disconnecting a communication link between a given conferee and the VRU.

7. The method of claim 6, wherein disconnecting includes the given conferee entering at least one DTMF signal into a handset.

8. The method of claim 6, wherein disconnecting includes the given conferee hanging up a handset.

9. The method of claim 1, further comprising sending a disconnect message to the mixer hosting a conference to which a given conferee coupled.

10. The method of claim 9, wherein sending a disconnect message includes referencing at least one parameter that was associated with the given conferee when the given conferee entered the conference.

11. The method of claim 1, further comprising muting of a single, selected conferee.

12. The method of claim 11, wherein muting includes at least in part referencing at least one parameter representing an order in which a plurality of conferees entered the conference.

13. The method of claim 12, further comprising obtaining the parameter by requesting a roll call of the conferees.

14. The method of claim 12, further comprising obtaining the parameter via web-based interface.

15. The method of claim 1, further comprising locking at least one given conference such that no additional conferees may be added to the at least one given conference.

16. The method of claim 15, wherein locking the at least one given conference is performed on a conferencing management system without involving a mixer hosting the at least one given conference.

17. The method of claim 15, wherein locking the at least one given conference is performed on at least one voice response unit receiving requests from the additional conferees, by direct access to a conferencing database.

18. The method of claim 17, wherein locking the at least one given conferee is performed without involving a mixer hosting the at least one given conference.

19. The method of claim 1, further comprising selectively deleting an individual conferee from a given conference.

20. The method of claim 19, wherein deleting the at least one individual conferee includes referring to at least one parameter that is related to an order in which a plurality of conferees entered the given conference.

21. The method of claim 20, further comprising obtaining the parameter via a roll call of conferees.

22. The method of claim 20, further comprising obtaining the parameter via a web-based interface.

23. The method of claim 1, further comprising outdialing from within the conference call to at least one third party.

24. A method of entering a conference call participant into a new conference call, the method comprising at least the following:
    receiving a call and receiving at least a conference code from a given caller at a VRU;
    forwarding the conference code to a proxy server via a provisioning database, wherein the provisioning database responds to the VRU with a signal indicating a validity or an invalidity of the conference code submitted by the VRU to the provisioning database;

sending a request to the proxy server to enter the given caller into a conference call and determining, by the proxy server, that the request from the VRU relates to conferencing services;

maintaining a list, by the proxy server, of each of a plurality of interface servers, wherein each of the plurality of interface servers function at least in part to support the queues that contain requests to be acted upon by a conferencing request, the proxy server further maintaining running counts of message requests pending or awaiting on each of the plurality of interface servers and performing load balancing across each of the plurality of interface servers;

forwarding, by the proxy server, the request to a conference management system, which comprises at least a data store and at least a plurality of interface servers receiving the request;

determining that the given caller is a conference participant;

requesting that a new conference be created that corresponds to the conference code entered by the given caller;

assigning the new conference to one of a plurality of mixers;

generating a unique identifier for the new conference;

providing the unique identifier to the one mixer and the VRU;

providing a mixer identifier that uniquely identifies the one mixer to the VRU;

loading the data store with at least the conference code, the unique identifier for the new conference, and the mixer identifier; and placing the VRU and the one mixer in audio communication.

25. A method of entering a conference call participant into a new conference call, the method comprising at least the following:

receiving a call and receiving at least a conference code from a given caller at a VRU;

forwarding the conference code to a proxy server via a provisioning database, wherein the provisioning database responds to the VRU with a signal indicating a validity or an invalidity of the conference code submitted by the VRU to the provisioning database;

sending a request to the proxy server to enter the given caller into a conference call and determining, by the proxy server, that the request from the VRU relates to conferencing services;

forwarding, by the proxy server, the request to a conference management system, which comprises at least a data store and at least one interface server receiving the request;

determining that the given caller is a conference participant;

requesting that the given caller be placed on hold until a conference host associated with the conference code calls in; and when the conference host calls in, performing at least the following:
assigning the new conference to one of a plurality of mixers;
generating a unique identifier for the new conference;
providing the unique identifier to the one mixer and the VRU;
providing a mixer identifier that uniquely identifies the one mixer to the VRU;
loading the data store with at least the conference code, the unique identifier for the new conference, and the mixer identifier; and
placing the VRU and the one mixer in audio communication.

26. A method of entering a conference call participant into a new conference call, the method comprising at least the following:

receiving a call and receiving at least a conference code from a given caller at a VRU;

forwarding the conference code to a proxy server via a provisioning database, wherein the provisioning database responds to the VRU with a signal indicating a validity or an invalidity of the conference code submitted by the VRU to the provisioning database;

sending a request to the proxy server to enter the given caller into a conference call and determining, by the proxy server, that the request from the VRU relates to conferencing services;

maintaining a list, by the proxy server, of each of a plurality of interface servers, wherein each of the plurality of interface servers function at least in part to support the queues that contain requests to be acted upon by a conferencing request, the proxy server further maintaining running counts of message requests pending or awaiting on each of the plurality of interface servers and performing load balancing across each of the plurality of interface servers;

forwarding, by the proxy server, the request to a conference management system, which comprises at least a data store and at least a plurality of interface servers receiving the request;

determining that the given caller is a conference participant;

requesting that the given caller be connected with at least a further caller temporarily until a conference host associated with the conference code calls in; and when the conference host calls in, performing at least the following:
assigning the new conference to one of a plurality of mixers;
generating a unique identifier for the new conference;
providing the unique identifier to the one mixer and the VRU;
providing a mixer identifier that uniquely identifies the one mixer to the VRU;
loading the data store with at least the conference code, the unique identifier for the new conference, and the mixer identifier; and
placing the VRU and the one mixer in audio communication.

27. A method of entering a host into a new conference call, the method comprising at least the following:

receiving a call and receiving at least a conference code from a given caller at a VRU;

forwarding the conference code to a proxy server via a provisioning database, wherein the provisioning database responds to the VRU with a signal indicating a validity or an invalidity of the conference code submitted by the VRU to the provisioning database;

sending a request to the proxy server to enter the given caller into a conference call and determining, by the proxy server, that the request from the VRU relates to conferencing services;

maintaining a list, by the proxy server, of each of a plurality of interface servers, wherein each of the plurality of interface servers function at least in part to support the queues that contain requests to be acted upon by a conferencing request, the proxy server further maintaining running counts of message requests pending or awaiting on each of the plurality of interface servers and performing load balancing across each of the plurality of interface servers;

forwarding, by the proxy server, the request to a conference management system, which comprises at least a data store and at least a plurality of interface servers receiving the request;

determining that an existing conference is at least related to the conference code entered by the given caller;

determining that the given caller is a conference host;

obtaining from the data store at least the unique identifier for the existing new conference and the mixer identifier related to the mixer hosting the existing conference; and placing the VRU to which the given caller is connected and the mixer hosting the existing conference in audio communication.

28. A method of entering a host into a new conference call;

receiving a call and receiving at least a conference code from a caller at a VRU;

forwarding the conference code to a proxy server via a provisioning database, wherein the provisioning database responds to the VRU with a signal indicating a validity or an invalidity of the conference code submitted by the VRU to the provisioning database;

sending a request to the proxy server to enter the caller into a conference call and determining, by the proxy server, that the request from the VRU relates to conferencing services;

maintaining a list, by the proxy server, of each of a plurality of interface servers, wherein each of the plurality of interface servers function at least in part to support the queues that contain requests to be acted upon by a conferencing request, the proxy server further maintaining running counts of message requests pending or awaiting on each of the plurality of interface servers and performing load balancing across each of the plurality of interface servers;

forwarding, by the proxy server, the request to a conference management system, which comprises at least a data store and at least a plurality of interface servers receiving the request;

determining that no existing conference corresponds to the conference code entered by the caller;

determining that the caller is a conference host;

requesting that a new conference be created that corresponds to the conference code entered by the caller;

assigning the new conference to one of a plurality of mixers, wherein the conference management system requests that the proxy server select one of the plurality of mixers to host the new conference call, which will be associated with a unique identifier generated for the new conference;

corresponding a unique mixer identifier to the selected mixer stored with the conference code and the conference identifier thereby associating the conference with the mixer;

providing the unique identifier to the one mixer and the VRU, wherein the mixer identifier uniquely identifies the one mixer to the VRU;

loading the data store with at least the conference code, the unique identifier for the new conference, and the mixer identifier; and placing the VRU and the one mixer in audio communication.

* * * * *